(12) United States Patent
Matsuoka et al.

(10) Patent No.: US 8,045,796 B2
(45) Date of Patent: Oct. 25, 2011

(54) IMAGE PROCESSING DEVICE AND IMAGE PROCESSING METHOD PERFORMING COLOR CONVERSION PROCESSING USING A LOOKUP TABLE

(75) Inventors: Yuki Matsuoka, Kanagawa (JP); Norihiko Kawada, Kanagawa (JP)

(73) Assignee: Sony Corporation, Tokyo (JP)

( * ) Notice: Subject to any disclaimer, the term of this patent is extended or adjusted under 35 U.S.C. 154(b) by 1091 days.

(21) Appl. No.: 11/897,165

(22) Filed: Aug. 29, 2007

(65) Prior Publication Data

US 2008/0055334 A1 Mar. 6, 2008

(30) Foreign Application Priority Data

Aug. 31, 2006 (JP) ................ P2006-236047
May 29, 2007 (JP) ................ P2007-141944

(51) Int. Cl.
 *G06K 9/00* (2006.01)
 *G06F 15/00* (2006.01)
 *G09G 5/02* (2006.01)
(52) U.S. Cl. ............ 382/167; 358/1.9; 345/600
(58) Field of Classification Search .......... 382/167
 See application file for complete search history.

(56) References Cited

U.S. PATENT DOCUMENTS

| 5,764,795 | A  | * | 6/1998  | Takeo et al. ........ 382/167 |
| 5,881,211 | A  | * | 3/1999  | Matsumura ......... 358/1.9 |
| 6,539,110 | B2 | * | 3/2003  | Myers .............. 382/162 |
| 6,567,543 | B1 | * | 5/2003  | Shiraiwa et al. ..... 382/167 |
| 6,603,483 | B1 | * | 8/2003  | Newman ............. 345/593 |
| 7,088,373 | B2 | * | 8/2006  | Asano .............. 345/600 |
| 7,483,172 | B2 | * | 1/2009  | Hung ............... 358/1.9 |
| 7,495,797 | B2 | * | 2/2009  | Okamoto ............ 358/1.9 |
| 2002/0163676 | A1 | * | 11/2002 | Jones et al. ......... 358/505 |

FOREIGN PATENT DOCUMENTS

| EP | 0 779 736   | 6/1997  |
| EP | 1 102 478   | 5/2001  |
| JP | 7 77954     | 3/1995  |
| JP | 2001-103329 | 4/2001  |
| JP | 2001 128018 | 5/2001  |
| JP | 2004 45313  | 2/2004  |
| JP | 2004 304773 | 10/2004 |
| JP | 2004 349838 | 12/2004 |
| JP | 2005 119189 | 5/2005  |
| JP | 2005 269503 | 9/2005  |
| JP | 2006 19937  | 1/2006  |
| WO | WO 00 74372 | 12/2000 |

\* cited by examiner

*Primary Examiner* — David Zarka
(74) *Attorney, Agent, or Firm* — Frommer Lawrence & Haug LLP; William S. Frommer; Thomas F. Presson

(57) ABSTRACT

An image processing device that performs color conversion processing using a lookup table (LUT) includes an acquiring unit that acquires an emulation LUT for applying emulation of a gamut to a target device from a device in use, the emulation LUT being generated using a device-in-use LUT for performing correction corresponding to input and output characteristics of the device in use and a target device LUT for performing correction corresponding to input and output characteristics of the target device, and a converting unit that performs gamut conversion in performing the emulation using the emulation LUT acquired by the LUT acquiring unit.

9 Claims, 22 Drawing Sheets

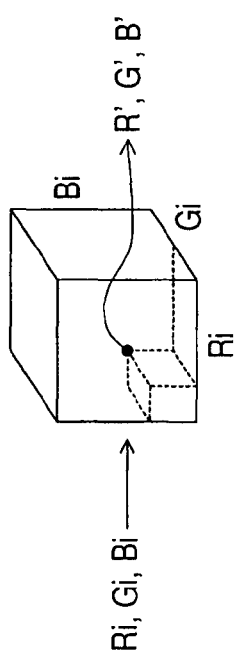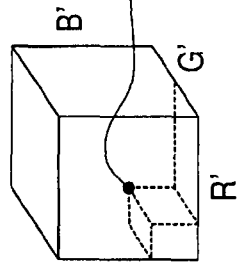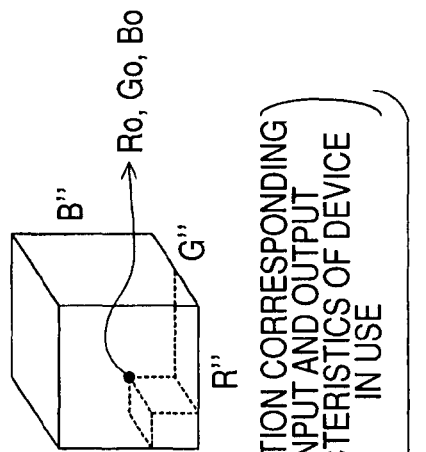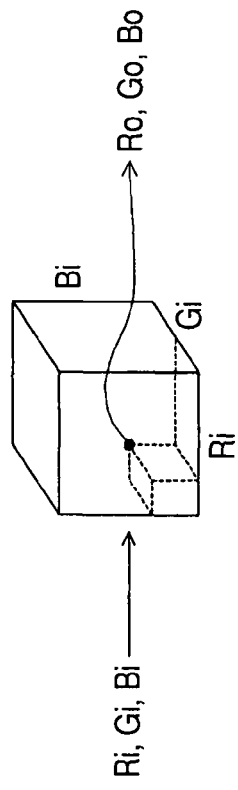
FIG. 2A TARGET DEVICE CHARACTERISTIC 3DLUT
(REPRODUCTION OF INPUT AND OUTPUT CHARACTERISTICS OF TARGET DEVICE)
FIG. 2B GAMUT CONVERSION 3DLUT
(GAMUT CONVERSION FROM TARGET DEVICE TO DEVICE IN USE)
FIG. 2C DEVICE IN USE CORRECTION 3DLUT
(CORRECTION CORRESPONDING TO INPUT AND OUTPUT CHARACTERISTICS OF DEVICE IN USE)
FIG. 2D 3DLUT FOR EMULATION

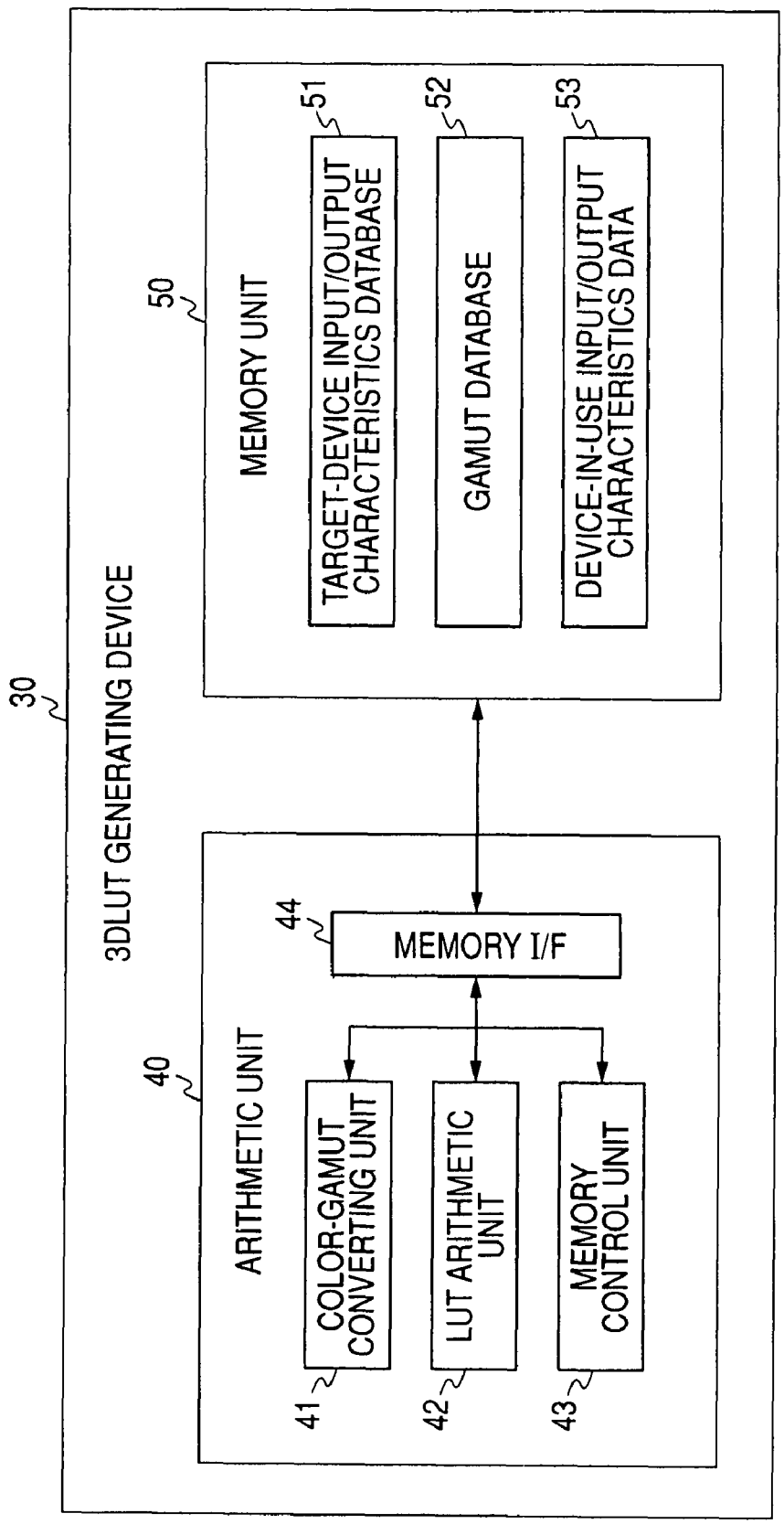

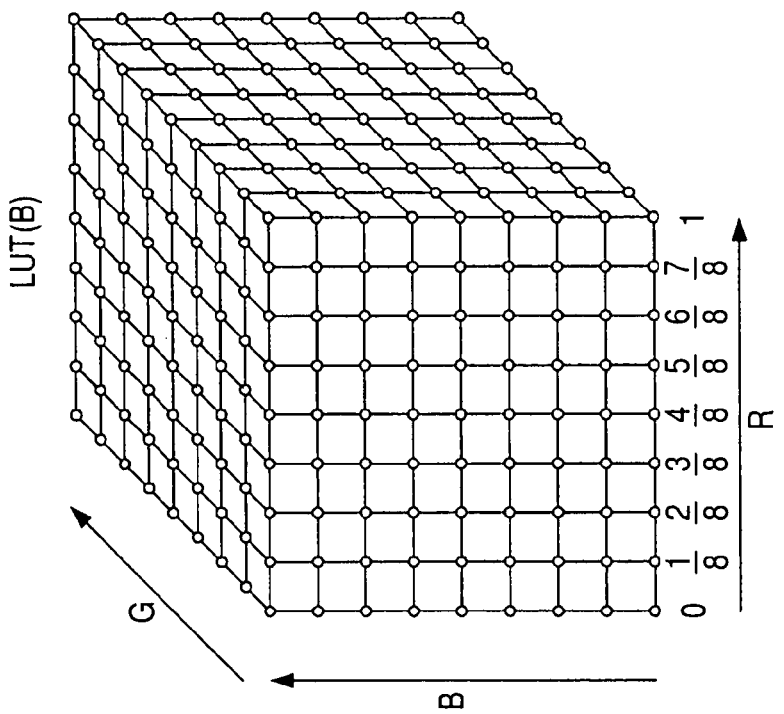
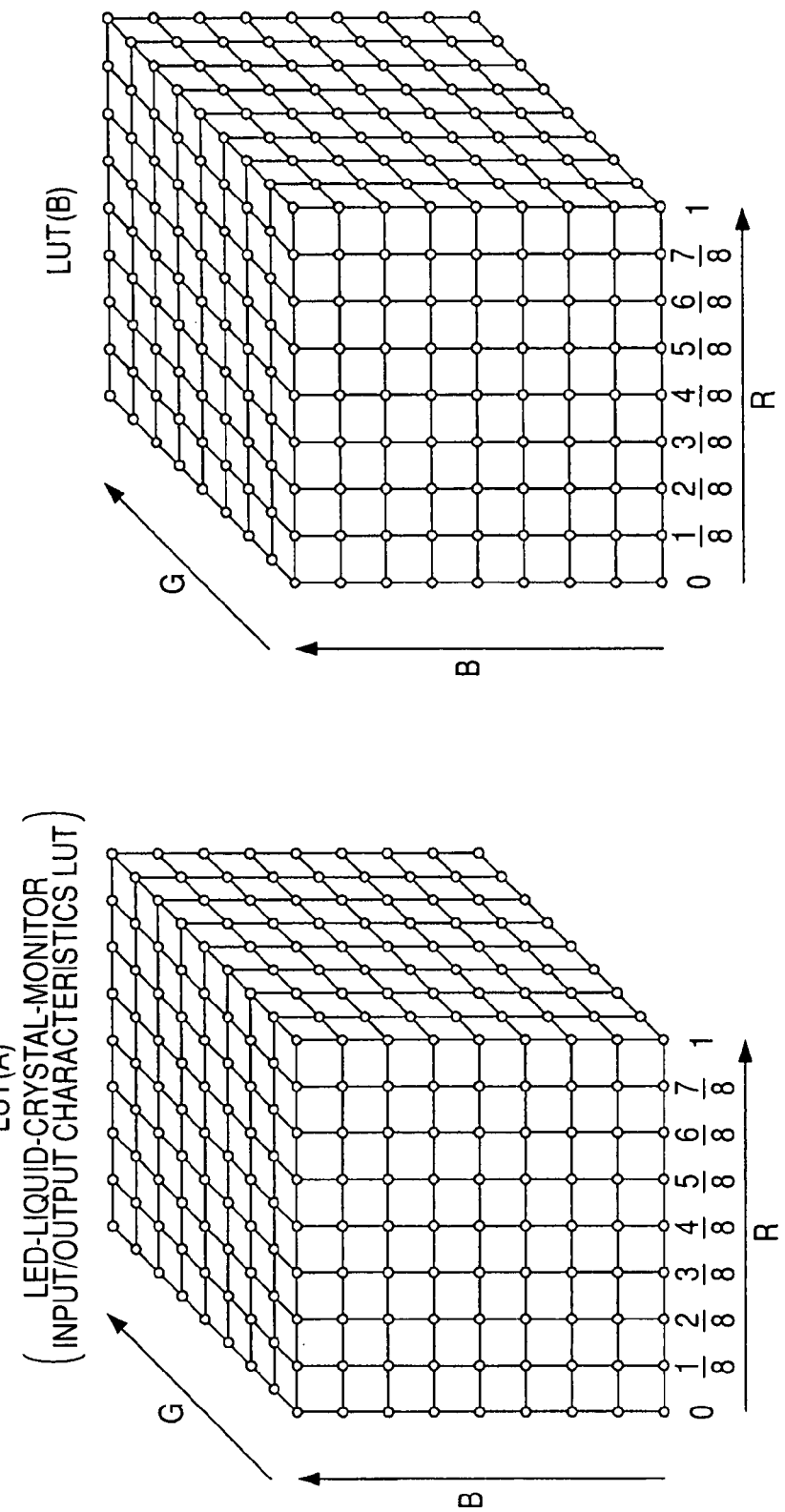
FIG. 9

IMAGE PROCESSING DEVICE AND IMAGE PROCESSING METHOD PERFORMING COLOR CONVERSION PROCESSING USING A LOOKUP TABLE

CROSS-REFERENCES TO RELATED APPLICATIONS

The present invention contains subject matter related to Japanese Patent Applications JP 2006-236047 and JP 2007-141944 filed in the Japanese Patent Office on Aug. 31, 2006 and May 29, 2007, respectively, the entire contents of which being incorporated herein by reference.

BACKGROUND OF THE INVENTION

1. Field of the Invention

The present invention relates to a color converting device that performs, when a first image processing device performs emulation for color reproduction using a second image processing device, color conversion for an image signal used in the first image processing device. The present invention also relates to a method for such emulation and a method of generating a three-dimensional lookup table used in the color conversion for the emulation. Moreover, the present invention relates to an image processing device including the three-dimensional lookup table for the emulation.

2. Description of the Related Art

As a patent document related to the present invention, there is JP-A-2006-19937.

In order to realize color reproduction between different kinds of devices or different kinds of media, it is necessary to correct a difference in a color range, i.e., a gamut, between input and output devices. A technique for the correction is called gamut conversion or gamut compression. For example, as a display output device that performs image display, there are a CRT (Cathode Ray Tube), a projector, a liquid crystal panel, and the like. As the projector, there are various projectors such as projectors of so-called DLP system and SXRD system and a film projector. As the liquid crystal panel, there are various liquid crystal panels such as a liquid crystal panel of an LED (Light Emitting Diode) backlight system. These display output devices have different gamuts as gamuts reproducible by the display output devices.

For example, in FIG. 21, a difference among gamuts of devices A to E, which represent the various display output devices, is shown as an XYZ chromaticity diagram.

Since the reproducible gamuts are different depending on the devices, for example, in order to cause a certain display output device to display a certain image signal, it is necessary to correct the image signal to be suitable for a gamut corresponding to the display output device.

When conversion of a gamut (compression of a gamut) is performed, it is a general practice to convert a color space with reference to a three-dimensional lookup table.

For example, as shown in FIG. 22, a three dimensional lookup table of a square cube having R, G, and B as axes (in the following explanation, lookup table may be referred to as "LUT" and three-dimensional lookup table may be referred to as "3DLUT") is conceivable. In this 3DLUT, R, G, and B values inputted are divided into seventeen coefficient points (lattice points of a 3D skeleton) on the axes, respectively, to form a table of 17×17×17 conversion table coefficients. There are 4913 (17×17×17) lattice points marked by black circles. Output R, G, and B values or coefficient values for deriving the output R, G, and B values are stored in the respective lattice points. In other words, an output RGB value is calculated from an input RGB value with reference to a certain lattice point.

An output value of an axis or a lattice point of the 3DLUT is not limited to an RGB value but may be values of other colorimetric systems.

SUMMARY OF THE INVENTION

Since a gamut is different depending on a display device as described above, a color represented in a certain display device is reproduced in a different color on another display device.

Here, an emulation technique is discussed. The emulation technique is a technique for simulating, for example, how an image displayed on a certain display device is seen on another display device. The emulation technique is a technique for, for example, when an image is created or edited using an LED backlight liquid crystal display device (hereinafter referred to as LED liquid crystal monitor), checking on the present display device (the LED liquid crystal monitor) how the image is reproduced on another display device such as a projector or a CRT.

For the purpose of explanation, a device presently in use, i.e., a device on which emulation is executed, is referred to as "device in used" and another device as an object of the emulation is referred to as "target device".

Since an image signal is basically a signal in a gamut of a target device, such emulation is performed by a method of converting the image signal into a gamut of the device in use and displaying the image signal subjected to gamut conversion on the device in use.

When a color displayed on a certain display device is reproduced in a different color on another display device, not only a difference in a gamut but also distortion characteristics of inputs and outputs of the respective display devices are related to a cause of the reproduction in the different color.

Therefore, in the emulation, it is difficult to accurately reproduce a color seen on the target device simply by performing the gamut conversion.

Therefore, it is desirable to perform not only the gamut conversion but also color conversion processing taking into account input and output characteristics of the device in use and input and output characteristics of the target device and realize emulation with high reproducibility.

A color converting device according to an embodiment of the present invention is a color converting device that performs, for emulation in a first image processing device (a device in use) for performing color reproduction using a second image processing device as a target device, color conversion for an image signal used (e.g., displayed) in the first image processing device. The color converting device converts a signal value of an inputted image signal into an output signal value using a three-dimensional lookup table (3DLUT). In the three-dimensional lookup table, input and output values including color conversion elements are set. The color conversion elements are elements for color conversion for reproducing input and output characteristics of the second image processing device, color conversion as gamut conversion between the second image processing device and the first image processing device, and color conversion as correction corresponding to input and output characteristics of the first image processing device.

The three-dimensional lookup table is generated by rewriting, in a three-dimensional lookup table having input and output values corresponding to the input and output characteristics of the second image processing device, respective output values to values subjected to gamut conversion into a gamut of the first image processing device, searching through a three-dimensional lookup table having input and output values set in characteristics opposite to the input and output characteristics of the first image processing device, and further rewriting the respective output values to values found by the search.

An emulation method according to another embodiment of the present invention is an emulation method of performing, in a first image processing device, color reproduction using a second image processing device as a target device. In the emulation method, color conversion is applied to a signal value of an image signal used in the first image processing device according to a three-dimensional lookup table in which input and output values including color conversion elements are set. The color conversion elements are elements for color conversion for reproducing input and output characteristics of the second image processing device, color conversion as gamut conversion between the second image processing device and the first image processing device, and color conversion as correction corresponding to input and output characteristics of the first image processing device. The image signal formed by an output signal value subjected to the color conversion using the three-dimensional lookup table is used in the first image processing device.

A method of generating a three-dimensional lookup table according to still another embodiment of the present invention is a method of generating, for emulation in a first image processing device for performing color reproduction using a second image processing device as a target device, a three-dimensional lookup table used for color conversion for an image signal used in the first image processing device. The method includes a step of acquiring a three-dimensional lookup table having input and output values corresponding to input and output characteristics of the second image processing device, a step of rewriting, in the three-dimensional lookup table, respective output values to values subjected to gamut conversion to a gamut of the first image processing device, and a step of searching through another three-dimensional lookup table having input and output values set in characteristics opposite to the input and output characteristics of the first image processing device and rewriting the respective output values to values found by the search.

An image processing device according to still another embodiment of the present invention includes an image processing unit that performs, for emulation for performing color reproduction using another image processing device as a target device, color conversion for an image signal used in the image processing device. In the three-dimensional lookup table, input and output values including color conversion elements are set. The color conversion elements are elements for color conversion for reproducing input and output characteristics of the image processing device set as the target device, color conversion as gamut conversion between a gamut of the image processing device set as the target device and a gamut of the image processing device, and color conversion as correction corresponding to input and output characteristics of the image processing device.

For example, this image processing device is a display device that applies color conversion to an inputted image signal in the image processing unit and performs display processing.

This image processing device is a printing device that applies color conversion to an inputted image signal in the image processing and performs print processing.

Further, this image processing device is an imaging device that performs imaging, applies color conversion to an image signal obtained by the imaging in the image processing unit, and performs recording processing or output processing.

According to the embodiments of the present invention, the color conversion is performed using the three-dimensional lookup table (a three-dimensional lookup table generated for use in color conversion for emulation). Color conversion as correction corresponding to the input and output characteristics of the first image processing device (the device in use that actually uses an image signal) (i.e., color distortion correction for the device in use), color conversion as gamut conversion between the first and second image processing devices, and color conversion as correction corresponding to the input and output characteristics of the second image processing device (the target device) (i.e., color distortion correction for reproducing the input and output characteristics of the target device) are collectively performed using the three-dimensional lookup table.

As devices equivalent to the first and second image processing device in the color converting device, the emulation method, and the method of generating a three-dimensional lookup table according to the embodiments of the present invention and devices equivalent to the image processing device according to the embodiment of the present invention, a display device (a display device) that performs image display, a printing device that performs image printing, an imaging device that performs imaging, and the like are conceivable. Besides, various other devices are conceivable.

According to the embodiments of the present invention, an image processing device can perform, using one three-dimensional lookup table, color conversion processing for emulation for performing color reproduction in another image processing device.

The three-dimensional lookup table is generated such that color conversion is executed taking into account not only gamut conversion between a first image processing device as a device in use and a second image processing device as a target device but also input and output characteristics in the device in use and input and output characteristics in the target device. Thus, there is an effect that it is possible to realize more highly accurate emulation with high reproducibility.

BRIEF DESCRIPTION OF THE DRAWINGS

FIGS. 2A to 2D are diagrams for explaining 3DLUTs for emulation according to the embodiment;

FIG. 3 is a block diagram of the 3DLUT generating device according to the embodiment;

FIG. 9 is a diagram for explaining a process for generating the LED correction 3DLUT according to the embodiment;

DESCRIPTION OF THE PREFERRED EMBODIMENTS

Items related to an embodiment of the present invention will be hereinafter explained in the following order.
[1. A color converting device and a 3DLUT generating device]
[2. Generation of a correction 3DLUT used for generation of a 3DLUT for emulation]
[3. Generation of a 3DLUT for emulation]
[4. Examples of use of a color converting device]
[5. Example in which a color converting device is built in a display device]
[6. Example in which a color converting device is built in printing device]
[7. Example in which a color converting device is built in an imaging device]
[1. A Color Converting Device and a 3DLUT Generating Device]

As an embodiment of the present invention, first, a color converting device and a 3DLUT generating device will be explained. Here, emulation processing for checking, on an LED liquid crystal monitor, how a certain image is reproduced on a CRT monitor will be explained as an example.

In this case, a first image processing device (a device in use) is the LED liquid crystal monitor and a second image processing device (a target device) is the CRT monitor.

The LED liquid crystal monitor has a gamut wider than that of the CRT monitor. Thus, a video created while being displayed on the LED liquid crystal monitor is reproduced in different colors on the CRT monitor. The emulation processing described in this example is processing for checking, on the LED liquid crystal monitor, how colors are reproduced on the CRT monitor. However, faithful emulation is not performed simply by performing gamut conversion corresponding to a difference in a gamut between the LED liquid crystal monitor and the CRT monitor. This is because the LED liquid crystal monitor and the CRT monitor have different input and output characteristics (color distortion).

This color distortion is a characteristic that is different for each of R, G, and B primary color signals. Therefore, the color distortion of an image processing device such as the LED liquid crystal monitor is represented three dimensionally.

Figure 1:
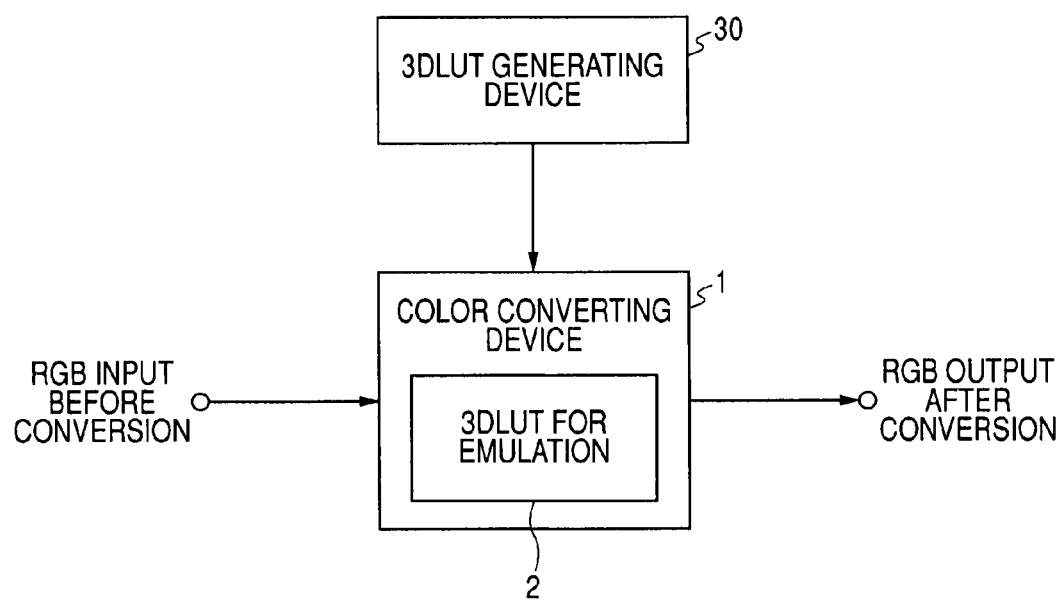
FIG. 1 is a diagram for explaining a color converting device and a 3DLUT generating device according to an embodiment of the present invention.

In this example, a color converting device 1 shown in FIG. 1 performs color conversion processing for emulation using a 3DLUT for emulation 2. Since the 3DLUT for emulation 2 has, in addition to a conversion element for gamut conversion, a conversion element for correcting input and output characteristics (color distortion) of each of the device in use (the LED liquid crystal monitor) and the target device (the CRT monitor), emulation with high reproducibility is realized.

In FIG. 1, the color converting device 1 is built in, for example, the LED liquid crystal monitor as the device in use and applies color conversion for emulation to an image signal displayed. Alternatively, the color converting device 1 may be formed as an external device and connected to the device in use.

An image signal (an RGB signal) not subjected to the color conversion for emulation is inputted to the color converting device 1.

The color converting device 1 applies conversion of an R value, a G value, and a B value to the image signal inputted using the 3DLUT for emulation 2 and outputs the image signal as an RGB signal after conversion.

For example, the 3DLUT for emulation 2 is a 3DLUT for performing emulation for the CRT monitor on the LED liquid crystal monitor. In this case, when the RGB signal after conversion outputted from the color converting device 1 is outputted to and displayed on the LED liquid crystal monitor, an image displayed on the LED liquid crystal monitor is an emulation image representing a state of color reproduction on the CRT monitor.

The 3DLUT for emulation 2 is generated by a 3DLUT generating device 30 shown in the figure and installed in the color converting device 1.

The 3DLUT generating device 30 may be provided integrally with the color converting device 1 or may be provided as a separate device. The 3DLUT generating device 30 can also be realized by, for example, a general-purpose computer device.

In any case, the 3DLUT for emulation 2 generated by the 3DLUT generating device 30 in advance is installed and stored in the color converting device 1. Thus, the color converting device 1 can perform color conversion for emulation.

FIGS. 2A to 2D show what the 3DLUT for emulation 2 in this example is like. In the emulation in this example, as described above, correction corresponding to input and output characteristics of the device in use and correction corresponding to input and output characteristics of the target device are performed in addition to gamut conversion.

The 3DLUT for emulation 2 in this example is shown in FIG. 2D. The 3DLUT for emulation has three-dimensional axes for an RGB value (Ri, Gi, Bi) as an inputted image signal. Each of the axes is divided into N coefficient points (lattice points of a 3D skeleton) in, for example, a range of 0.0 to 1.0 for the Ri value, the Gi value, and the Bi value to form a table including N×N×N conversion coefficients. For example, the 3DLUT for emulation 2 is a three-dimensional conversion table including the number of lattice points such as 9×9×9, 17×17×17, or 32×32×32. The number of lattice points is not specifically limited. An appropriate number of lattice points only have to be arbitrarily selected.

Figure 22:
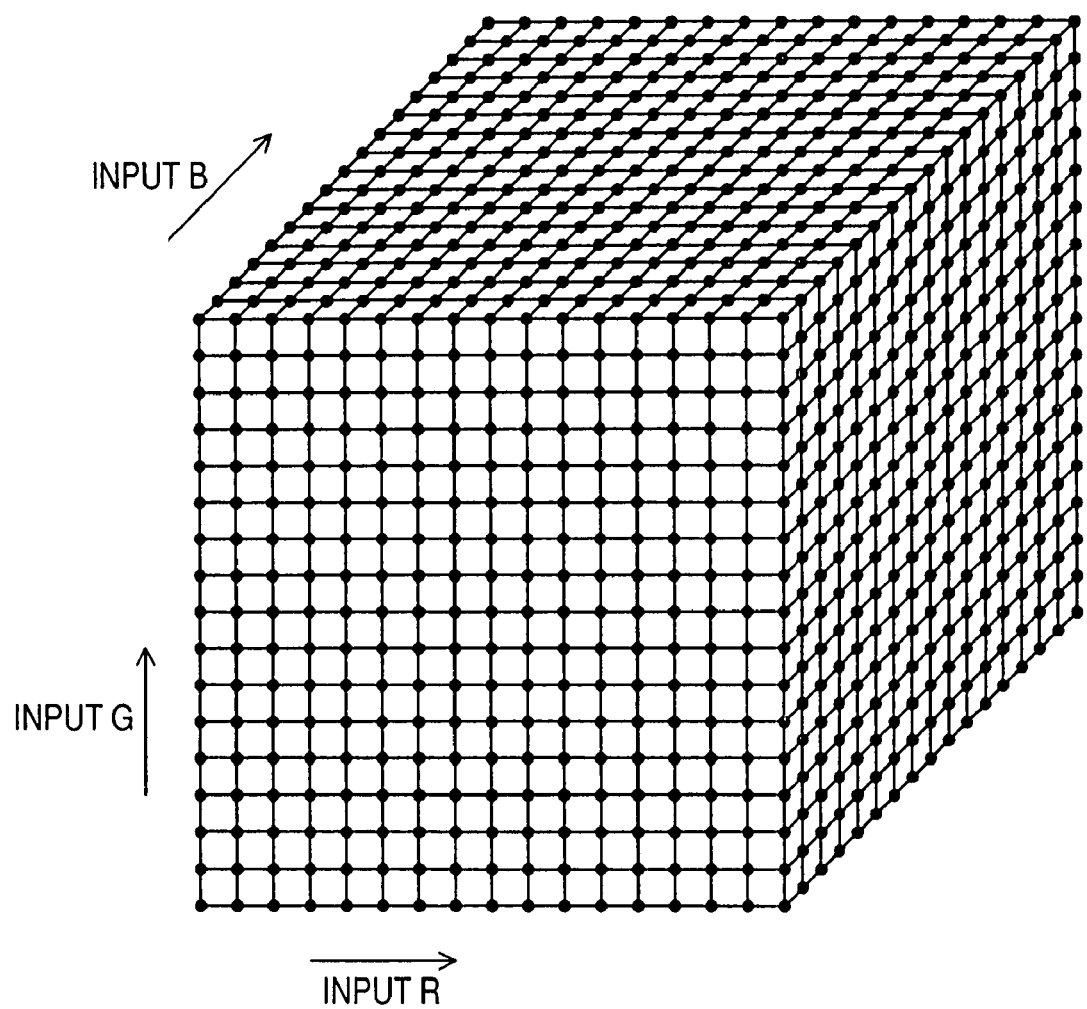
FIG. 22 is a diagram for explaining a 3DLUT.

For example, when N is 17 and the number of lattice points is 17×17×17, in the 3DLUT for emulation 2, as shown in FIG. 22, there are 4913 (17×17×17) lattice points marked by black circles. An Ro value, a Go value, and a Bo value to be outputted or coefficient values for deriving the Ro value, the Go value, and the Bo value to be outputted are stored in the respective lattice points.

In other words, an Ro value, a Go value, and a Bo value for performing emulation display are calculated by referring to lattice points derived from the three-dimensional axes for an Ri value, a Gi value, and a Bi value inputted.

In this example, the RGB value is described as an example of output values of the axes or the lattice points of the 3DLUT. However, the output values of the axes or the lattice points of the 3DLUT are not limited to the RGB value. Values of other colorimetric systems such as values of YCC (a luminance and a color difference signal), values of CMY (cyan, magenta, and yellow), values of L*a*b* colorimetric system, and values of a CIE_LUV colorimetric system may be used.

In the case of this example, the 3DLUT for emulation 2 has all elements as a target-device characteristic 3DLUT, elements as a gamut conversion 3DLUT, and elements as a device-in-use correction 3DLUT shown in FIGS. 2A, 2B, and 2C. The target-device characteristic 3DLUT in FIG. 2A is a three-dimensional lookup table for obtaining, from the Ri value, the Gi value, and the Bi value inputted, an R' value, a G' value, and a B' value as outputs calculated as a result of performing correction for reproduction of input and output characteristics of the target device.

The gamut conversion 3DLUT in FIG. 2B is a three-dimensional lookup table for, considering that the R' value, the G' value, and the B' value inputted are a gamut of the target device (the CRT monitor), obtaining an R" value, a G" value, and a B" value calculated by converting the gamut into a gamut of the device in use (the LED liquid crystal monitor).

The device-in-use correction 3DLUT in FIG. 2C is a three-dimensional lookup table for obtaining, from the R" value, the G" value, and the B" value inputted, an Ro value, a Go value, and a Bo value as outputs calculated as a result of performing correction corresponding to the input and output characteristics of the device in use.

FIGS. 2A to 2D are conceptual diagrams in any way. However, the 3DLUT for emulation 2 in this example is formed as a three-dimensional lookup table having all the element as the target-device characteristic 3DLUT, the element as the gamut conversion 3DLUT, and the element as the device-in-use correction 3DLUT.

Therefore, in the 3DLUT2 for emulation, when the Ri value, the Gi value, and the Bi value inputted are converted into the Ro value, the Go value, and the Bo value for performing emulation display, an Ro value, a Go value, and a Bo value as a result of performing the gamut conversion, the correction of the input and output characteristics of the target device, and the correction of the input and output characteristics of the device in use are obtained. Consequently, emulation with high reproducibility is realized.

The concept of the conversion processing employing the 3DLUT for emulation 2 is as described below.

The gamut conversion is conversion of an image signal in a gamut of the target device into a gamut of the device in use.

For example, when a CRT is assumed as the target device and emulated on the LED liquid crystal monitor as the device in use, a state of an image signal displayed on the CRT monitor is reproduced on the LED liquid crystal monitor.

Therefore, first, assuming that "color reproduction at the time when the image signal is displayed on the CRT monitor is correct", it is necessary to grasp that the image signal is an image signal for the CRT monitor. In other words, it is necessary to consider that an RGB signal before conversion inputted to the color converting device 1 in FIG. 1, i.e., the Ri value, the Gi value, and the Bi value shown in FIGS. 2A to 2D, is an image signal for the CRT monitor.

It does not matter what kind of gamut the image signal actually has. It is sufficient that an image that "looks in this way on the CRT monitor" can be reproduced on the LED liquid crystal monitor. Even if a gamut of the image signal is a gamut of the LED liquid crystal monitor, in emulation, the image signal only has to be grasped as a CRT gamut.

On this premise, "an image signal for the CRT monitor" is displayed on the "LED liquid crystal monitor" in the emulation. Thus, the gamut conversion employing the 3DLUT for emulation 2 in this example is processing for converting the "CRT gamut" into an "LED liquid crystal monitor gamut". More in general, the gamut conversion in the emulation is processing for converting a "gamut of the target device" into a "gamut of the device in use".

The correction corresponding to the input and output characteristics of the target device in this case means addition of a color distortion component of the CRT monitor and is conversion processing for reproducing input and output characteristics of the CRT itself. In other words, taking into account the fact that the CRT itself has input and output characteristics different from those of other display devices, a color distortion component due to the input and output characteristics of the CRT itself is given as a conversion element in the emulation to make it possible to clearly display what "looks in this way on the CRT monitor".

The correction corresponding to the input and output characteristics of the device in use is, in this case, correction for giving a characteristic opposite to the color distortion component of the LED liquid crystal monitor. In other words, the correction is processing for preventing the input and output characteristics of the LED liquid crystal monitor from affecting display. The LED liquid crystal monitor itself has, as input and output characteristics, color distortion different from that of other display devices. Therefore, when the LED liquid crystal monitor is used, naturally, a display color on the LED liquid crystal monitor is affected by the input and output characteristics of the LED liquid crystal monitor. When a state of display on another target device is reproduced on the LED liquid crystal monitor, this is an element that impedes accuracy of the reproduction. In other words, elements of characteristics of the LED liquid crystal monitor are included in the display of what "looks in this way on the CRT monitor".

Thus, in this example, the conversion for giving a characteristics opposite to the input and output characteristics of the LED liquid crystal monitor is performed to make it possible to consider, as a result, that the LED liquid crystal monitor is a device without color distortion. This results in a situation in which "an image signal subjected to the gamut conversion and subjected to the conversion with the input and output characteristics of the target device taken into account is displayed on the display device without color distortion". Therefore, it is possible to realize extremely highly accurate emulation display.

As described above, the 3DLUT for emulation 2 in this example is a 3DLUT for performing the color conversion including the three conversion elements, i.e., the gamut conversion, the correction corresponding to the input and output characteristics of the target device, and the correction corresponding to the input and output characteristics of the device in use.

In the color converting device 1 in FIG. 1, since such a 3DLUT for emulation 2 is arranged, highly accurate emulation is realized.

It goes without saying that, for this purpose, the 3DLUT for emulation 2 for realizing the color conversion including the three conversion elements has to be generated by the 3DLUT generating device 30 in advance.

A structure of the 3DLUT generating device 3 is shown in FIG. 3.

The 3DLUT generating device 30 has an arithmetic unit 40 and a memory unit 50. The arithmetic unit 40 performs various arithmetic operations and memory accesses for generation of the 3DLUT for emulation 2. The memory unit 50 stores various data for generation of the 3DLUT for emulation 2.

In the memory unit 50, various databases and data such as a target-device input/output characteristic database 51, a gamut database 52, and device-in-use input/output characteristic data 53 are stored.

The target-device input/output characteristic database 51 stores input and output characteristics of various image processing devices assumed as the target device. When the 3DLUT for emulation 2 with the CRT as the target device is generated as in this example, it is necessary that at least data of the input and output characteristics of the CRT is stored. The data of the input and output characteristics only has to be stored in a form of a 3DLUT. For example, a CRT input/output characteristic LUT described later is stored as data of the input and output characteristic of the CRT.

In the gamut database 52, information on gamuts of the various image processing devices is stored. In the case of this example, it is necessary that at least gamut information of the LED liquid crystal monitor and gamut information of the CRT monitor are stored.

The device-in-use input/output characteristic data 53 stores the input and output characteristics of the device in use. In the case of this example, it is necessary that data of the input and output characteristics of the LED liquid crystal monitor is stored. Specifically, the data of the input and output characteristics only has to be stored in a form of a 3DLUT. An LED-liquid-crystal-monitor input/output characteristic LUT described later is stored.

However, the device-in-use input/output characteristic data 53 is used for generating a correction 3DLUT described later. However, it is also possible that, for example, the correction 3DLUT is generated in advance in an arithmetic processing device on the outside and data of the correction 3DLUT is stored in the memory unit 50.

When the 3DLUT generating device 30 is a general-purpose device, a device in use of which is not limited to the LED liquid crystal monitor, it is sufficient that the target-device input/output characteristic database 51 and the device-in-use input/output characteristic data 53 are integrated and the input and output characteristics of the various image processing devices are stored in a form of a database. In other words, in generating a 3DLUT for target emulation, it is sufficient that the input and output characteristics of the target device and the device in use can be read out.

The CRT input/output LUT and the LED-liquid-crystal-monitor input/output characteristic LUT only have to be generated by measuring output RGB values at the time when the respective colors (RGB signals) are actually inputted to the respective image processing devices (display devices) sequentially.

In the arithmetic unit 40, it is conceivable that a gamut converting unit 41, an LUT arithmetic unit 42, a memory control unit 43, and a memory interface 44 are formed as processing functions of the arithmetic unit 40.

The gamut converting unit 41 performs an arithmetic operation for the gamut conversion. When the 3DLUT for emulation 2 for emulating, on the LED liquid crystal monitor, a state of display on the CRT monitor is generated, in the gamut converting unit 41, an arithmetic operation for converting a CRT monitor gamut into an LED liquid crystal monitor gamut is performed.

The LUT arithmetic unit 42 performs arithmetic processing between LUTs. For example, the LUT arithmetic unit 42 performs processing for substituting a value of a lattice point of one 3DLUT in a lattice point of the other 3DLUT.

The memory control unit 43 accesses the memory unit 50 via the memory interface 44 and reads out information necessary for the generation of the 3DLUT for emulation 2.

[2. Generation of a Correction 3DLUT Used for Generation of a 3DLUT for Emulation]

The generation of the 3DLUT for emulation 2 performed by the 3DLUT generating device 30 will be herein after explained.

In processing for generating the 3DLUT for emulation 2, a correction 3DLUT generated in advance is used. Thus, first, the generation of the correction 3DLUT will be described. The correction 3DLUT is the device-in-use correction 3DLUT shown in FIG. 2C. In other words, the correction 3DLUT is a 3DLUT for performing correction corresponding to the input and output characteristics of the device in use.

In the case of this example, the correction 3DLUT is a 3DLUT having characteristics opposite to the input and output characteristics of the LED liquid crystal monitor. The generation of an "LED correction 3DLUT" as the correction 3DLUT having the characteristics opposite to those of the LED liquid crystal monitor will be hereinafter explained with reference to FIGS. 8 to 12.

Figure 8:
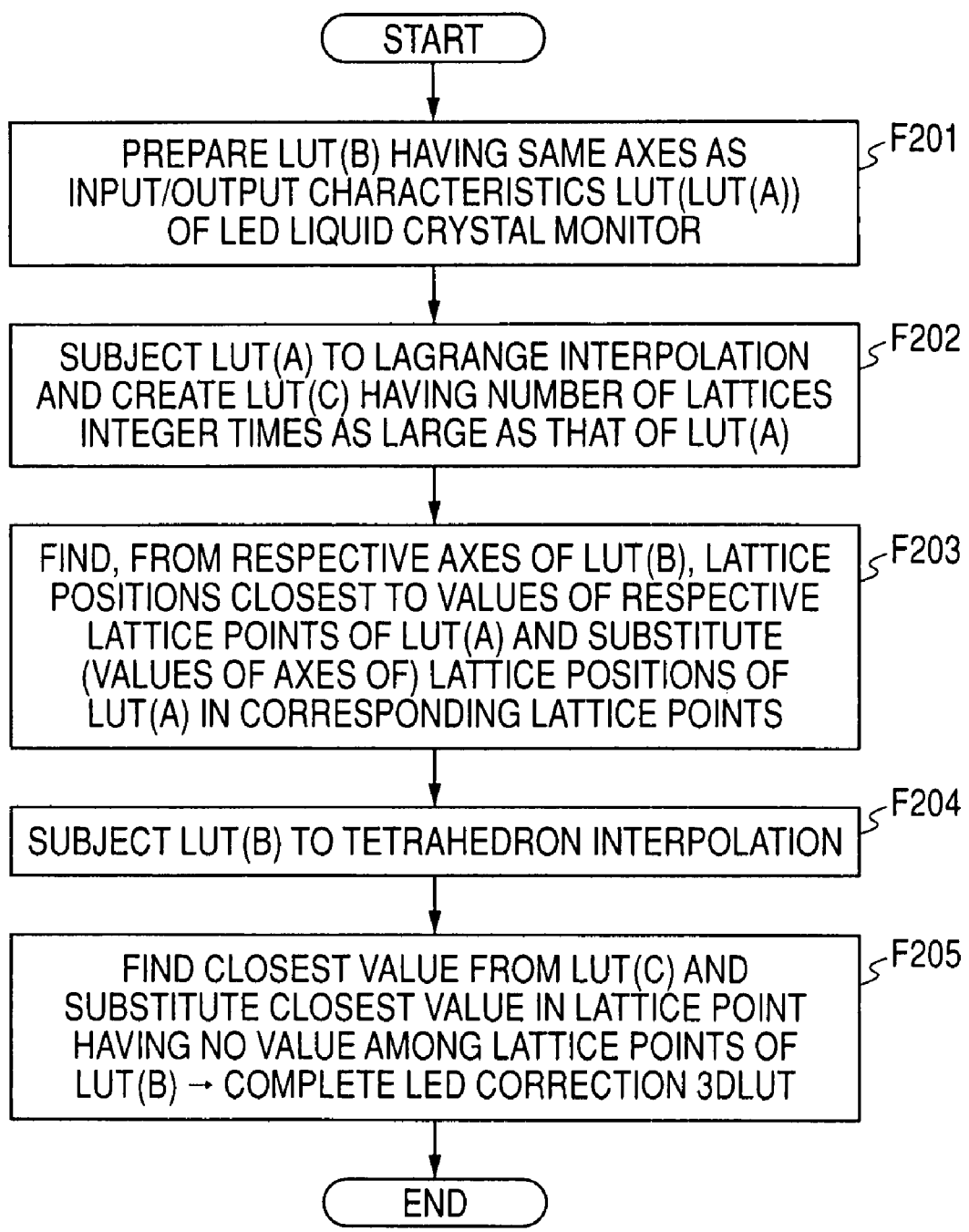
FIG. 8 is a flowchart of processing for generating an LED correction 3DLUT according to the embodiment.

FIG. 8 shows a procedure of the generation of the LED correction 3DLUT executed by the arithmetic unit 40 of the 3DLUT generating device 30. In this explanation, the LED correction 3DLUT is generated by the arithmetic unit 40 of the 3DLUT generating device 30. However, generation processing described below may be executed by another arithmetic device having a high arithmetic ability to cause the 3DLUT generating device 30 to store the LED correction 3DLUT.

First, in step F201, the arithmetic unit 40 prepares an LUT (B) having the same axes as the LED-liquid-crystal-monitor input/output characteristic LUT (an LUT(A)).

The LED-liquid-crystal-monitor input/output characteristic LUT (hereinafter, LUT(A)) and the LUT(B) are shown in FIG. 9. The LUT(A) as the LED-liquid-crystal-monitor input/output characteristic LUT is stored in the memory unit 50 and the device-in-use input/output characteristic data 53 as described above.

This LUT(A) divides a range of 0.0 to 1.0 of an R value, a G value, and a B value into N pieces on R, G, and B axes and has N×N×N lattice points. (Output values of axes and lattice points of a 3DLUT are not limited to the RGB value. Values of other colorimetric systems such as XYZ, YCC, CMY, L*a*b*, and CIE_LUV may be used.)

Output RGB values corresponding to input RGB values are stored in the respective lattice points formed three dimensionally. In this LUT(A), the input RGB values and the output RGB values of the respective lattice points corresponding to the input RGB values are values corresponding to the input and output characteristics (the color distortion) of the LED liquid crystal monitor.

On the other hand, the LUT(B) is prepared as a storage area having a three-dimensional lattice structure same as that of the LUT(A).

Figure 10:
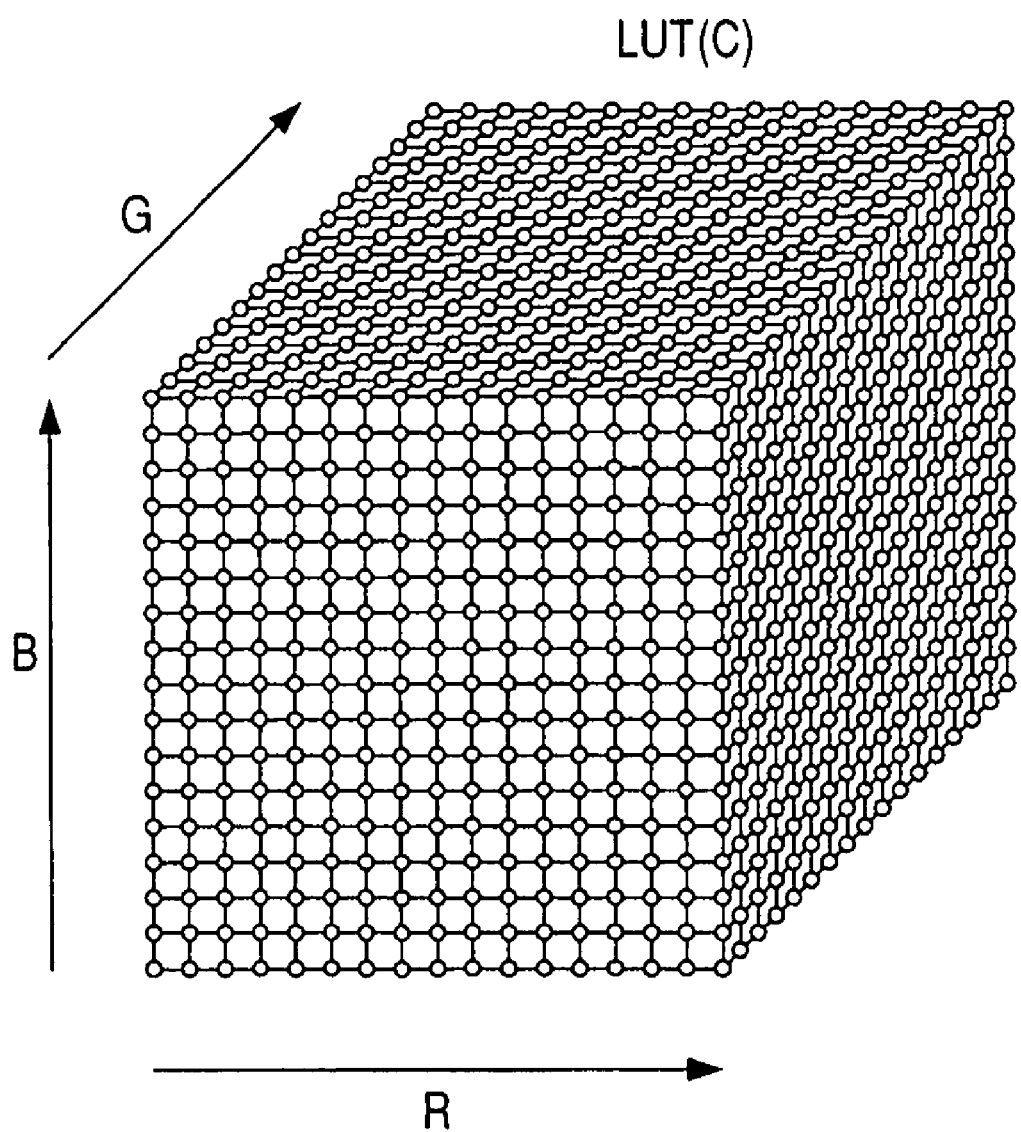
FIG. 10 is a diagram for explaining a process for generating the LED correction 3DLUT according to the embodiment.

In the next step F202, the arithmetic unit 40 subjects the LUT(A) to the Lagrange's interpolation to create an LUT(C) having lattice points integer times as many as those of the LUT(A). The LUT(C) is shown in FIG. 10. An interpolation formula used for the Lagrange's interpolation is as follows.

When n points $(x_i, y_i)$ (i=0, 1, ..., n−1) are given, an (n−1)th-order polynomial satisfying $y_i = P(x_i)$ (i=0, 1, ..., n-1), i.e., $P(x_i)=C_{n-1}x^{n-1}+C_{n-2}x^{n-2}+\ldots+C_1x+C_0$, is uniquely decided. Any two $x_i$ are not equal.

A closed formula representing this polynomial is the Lagrange's interpolation formula, which is represented as follows.

$$P(x) = \sum_{i=0}^{N-1}\left(y_i \prod_{j\neq i} \frac{x-x_i}{x_i-x_j}\right)$$

In step F203, the arithmetic unit 42 performs processing for finding lattice positions closest to values of respective lattice points of the LUT(A) from the respective axes of the LUT(B) and substituting lattice positions (values of the axes) of the LUT(A) in lattice points corresponding to the lattice positions.

Figure 11:
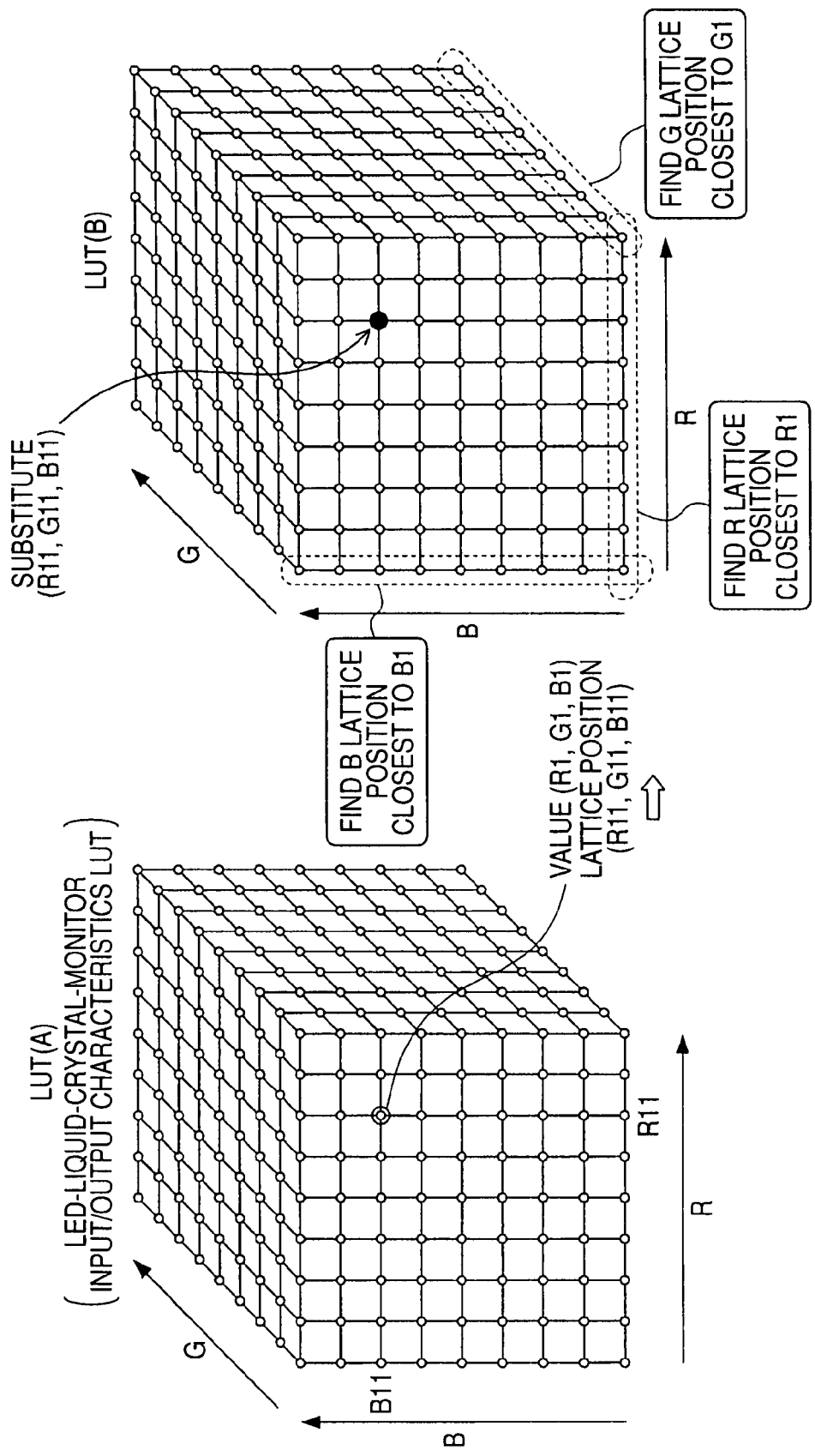
FIG. 11 is a diagram for explaining a process for generating the LED correction 3DLUT according to the embodiment.

A state of this processing is shown in FIG. 11. A lattice point marked by a double circle in the LUT(A) in FIG. 11 is an example of such a lattice point. The lattice point marked by the double circle is in a lattice position (R11, G11, B11). This lattice point is a lattice point derived from a value R11, on the R axis, a value G11 on the G axis, and a value B11 on the B axis. In other words, the lattice point marked by the double circuit is a lattice point referred to when input RGB value is (R11, G11, B11).

It is assumed that (R1, G1, B1) is stored as a value in the lattice point marked by the double circle. Since the LUT(A) is the 3DLUT of the input and output characteristics of the LED liquid crystal monitor, when an RGB signal (R11, G11, B11) is supplied to the LED liquid crystal monitor, it is possible to consider that an RGB output with the value (R1, G1, B1) is performed in the LED liquid crystal monitor.

First, for each of the values R1, G1, and B1 stored in the lattice point marked by the double circuit, a closest value on each axis of the LUT(B) is searched for. For the value R1, a closest value (a lattice position on the R axis) is searched for as a value on the R axis of the LUT(B). For the value G1, a closest value (a lattice position on the G axis) is searched for as a value on the G axis of the LUT(B). Moreover, for the value B1, a closest value (a lattice position on the B axis) is searched for as a value on the B axis of the LUT(B).

Here, one lattice point is derived from the lattice positions on the three axes of the LUT(B) found. It is assumed that this lattice point is a lattice point marked by a black circle.

The lattice position (R11, G11, B11) of the lattice point marked by the double circle of the LUT(A) is substituted in this lattice point marked by the black circle as a value.

Such processing is executed for all the lattice points of the LUT(A).

A value of a lattice position (e.g., (R11, G11, B11) described above) of the LUT(A) is an input RGB value of the LED liquid crystal monitor. A value (e.g., (R1, G1, B1) described above) stored in each lattice point is a value actually display-outputted with respect to the input RGB value.

The LUT(B) in which the lattice position of the lattice point of the LUT(A) is written in the lattice point derived from the lattice position close to the stored value of the lattice point of the LUT(A) in the processing described above is a 3DLUT having characteristics opposite to the input and output characteristics of the LED liquid crystal monitor.

However, at this point in time, values of all the lattice points are not always written in the LUT(B). Since a lattice point consisting of respective RGB lattice positions considered to be closest to a value stored in each lattice point of the LUT(A) is searched for, the characteristics are not always precisely opposite to the input and output characteristics of the LED liquid crystal monitor.

In step F204, the arithmetic unit 42 applies tetrahedral interpolation to the LUT(B). The arithmetic unit 42 performs interpolation for a value of each lattice point from values of lattice points around the lattice point and performs substitution of interpolation values in lattice points in which values are not substituted and fine adjustment of the value substituted in the lattice point in step F203. In this way, the arithmetic unit 42 improves accuracy of the LUT(B) as an LUT having the opposite characteristics.

Finally, in step F205, the arithmetic unit 42 finds closest values from the LUT(C) and substitutes the values in lattice points in which values are not substituted yet among the lattice points of the LUT(B).

Figure 12:
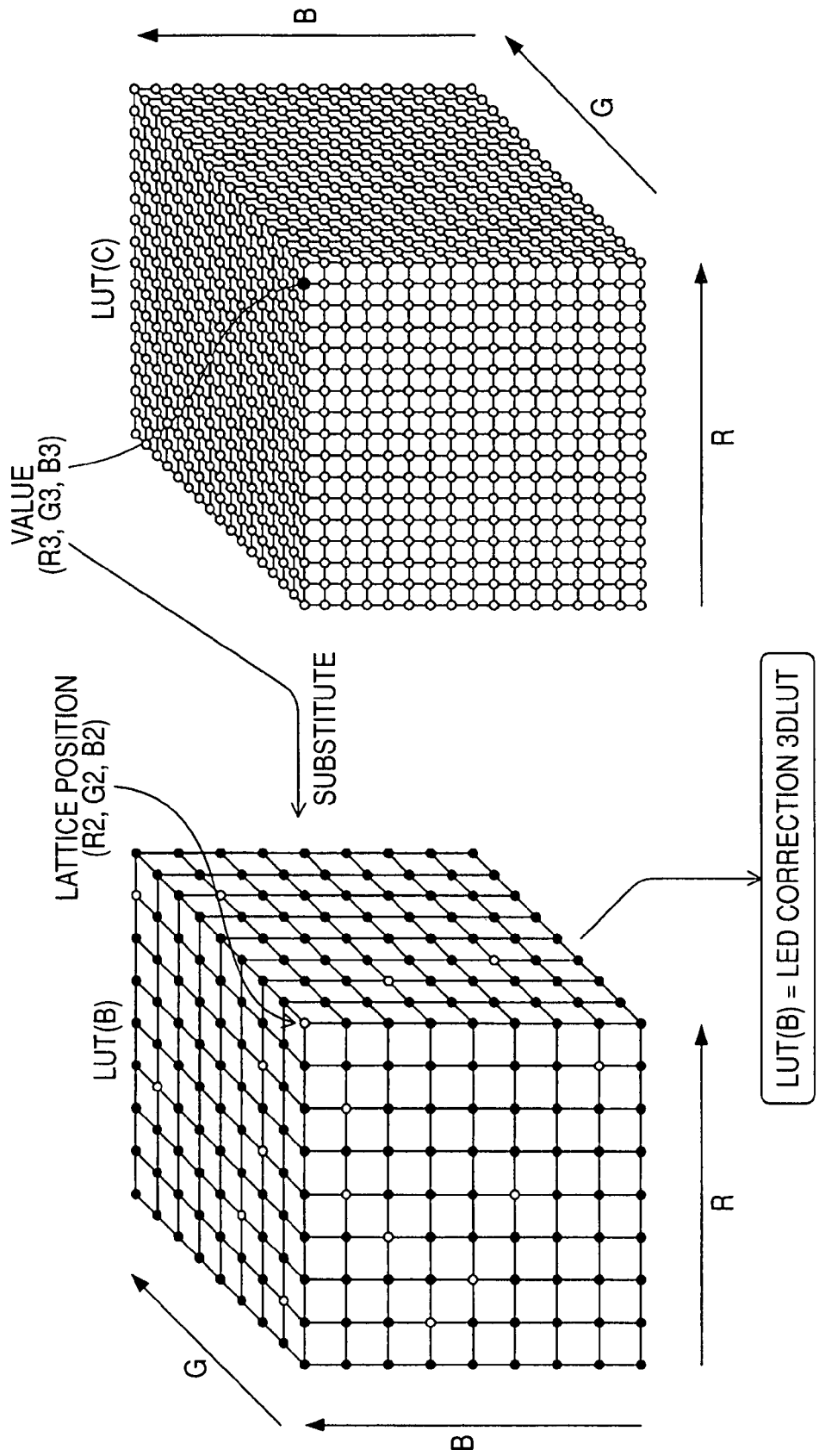
FIG. 12 is a diagram for explaining a process for generating the LED correction 3DLUT according to the embodiment.

A state of the processing is shown in FIG. 12.

In the LUT(B) shown in FIG. 12, black circles indicate lattice points in which values are substituted in the processing up to step F204. White circles indicate lattice points in which values are not substituted yet.

A lattice point in which a value (values on the respective RGB axes) of a lattice position is (R2, G2, B2) is explained as an example of the lattice points marked by the white circles. A value is not stored in the lattice point of the lattice position yet.

For the lattice position (R2, G2, B2), a closest value (a closest color) in the LUT(C) is searched for. When, for example, a value (R3, G3, B3) of a lattice point of the LUT(C) is the closest value, the value (R3, G3, B3) is substituted as a value stored in the lattice point of the lattice position (R2, G2, B2) of the LUT(B).

Such processing is applied to all the lattice points marked by the white circles in which values are not substituted.

The "closest value" only has to be selected as a color for which a value of a color difference formula of $\Delta E^*$ or $\Delta^*94$, which is a color difference formula defined by the CIE (Commission Internationale de l'Eclairage), is minimized.

$$\Delta E^* = \sqrt{(\Delta L^*)^2 + (\Delta a^*)^2 + (\Delta b^*)^2}$$

$$\Delta E_{94}^* = \sqrt{\left(\frac{\Delta L^*}{k_L \cdot S_L}\right)^2 + \left(\frac{\Delta C_{ab}^*}{k_C \cdot S_C}\right)^2 + \left(\frac{\Delta H_{ab}^*}{k_H \cdot S_H}\right)^2}$$

$$S_L = 1$$

$$S_C = 1 + 0.045 \times \sqrt{C_{ab,1}^* \cdot C_{ab,2}^*}$$

$$S_H = 1 + 0.015 \times \sqrt{C_{ab,1}^* \cdot C_{ab,2}^*}$$

The L*a*b* colorimetric system is a device-independent colorimetric system independent defined by the CIE. An L* value is brightness and all hues are represented as combinations of a* and b*. An a* value is chroma of red to green and a b* value is chroma of yellow to blue.

In Formulae 2 and 3 above, $\Delta L^*$ is a difference of the L* value, $\Delta a^*$ is a difference of the a* value, and $\Delta b^*$ is a difference of the b* value. C* and H* are values of a so-called L*C*H* colorimetric system. C* is chroma and H* is hue.

C* and H* are calculated as follows.

$$C^* = \sqrt{a^{*2}+b^{*2}}$$

$$H^* = \arctan(b^*/a^*)$$

For example, when a closest value (a closest color) in the LUT(C) is found for the lattice point (R2, G2, B2), (R2, G2, B2) is converted into L*a*b*.

Values of all the lattice points of the LUT(C) are converted into L*a*b*. Then, it is possible to calculate ΔL*, Δa*, and Δb* in (R2, G2, B2) and the values of the respective lattice points of the LUT(C). It is also possible to find a closest value according to the color difference formula of ΔE* or ΔE*94.

It is possible to obtain an L* value, an a* value, and a b* value from values of R, G, and B according to the following Formula 5.

$$\begin{bmatrix} X \\ Y \\ Z \end{bmatrix} = \begin{bmatrix} a' & b' & c' \\ d' & e' & f' \\ g' & h' & i' \end{bmatrix} \begin{bmatrix} R \\ G \\ B \end{bmatrix}$$

$$L^* = 116(Y/Yn)^{1/3} - 16$$

$$a^* = 500\{(X/Xn)^{1/3} - (Y/Yn)^{1/3}\}$$

$$b^* = 200\{(Y/Yn)^{1/3} - (Z/Zn)^{1/3}\}$$

Here, Xn, Yn, and Zn are tristimulus values of a light source. For example, in the case of a standard illuminant $D_{65}$, (Xn, Yn, Zn)=(95.04, 100.00, 108.89).

According to the processing in step F205, values are substituted in the lattice points marked by the white circles of the LUT(B) in FIG. 12. Consequently, values are stored in all the lattice points of the LUT(B).

At this point in time, the LUT(B) is completed as the LED correction 3DLUT, which represents the characteristics opposite to the input and output characteristics of the LED liquid crystal monitor, corresponding to FIG. 2C.

[3. Generation of a 3DLUT for Emulation]

Processing for generating a 3DLUT for emulation using the LED correction 3DLUT generated as described above will be explained with reference to FIGS. 4 to 7.

Figure 4:
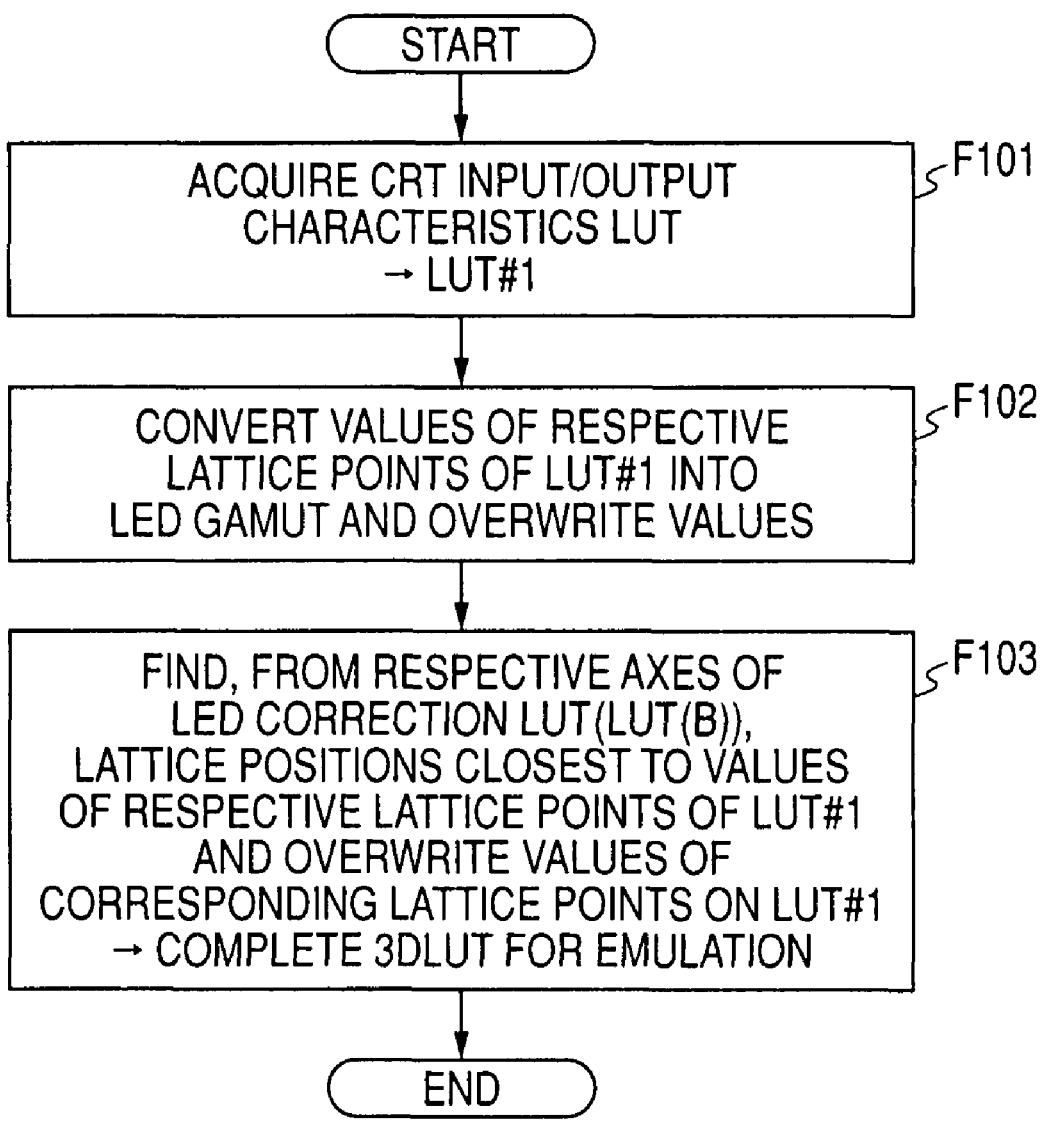
FIG. 4 is a flowchart of processing for generating the 3DLUT for emulation according to the embodiment.

FIG. 4 shows a procedure of generation of the 3DLUT for emulation 2 executed by the arithmetic unit 40 of the 3DLUT generating device 30.

First, in step F101, the arithmetic unit 40 acquires a CRT-monitor input/output characteristic LUT and sets this CRT-monitor input/output characteristic LUT as an LUT#1. As described above, the CRT-monitor input/output characteristic LUT is prepared by measurement in advance and stored in the target-device input/output characteristic database 51 of the memory unit 50. Thus, step F101 is processing for reading out the CRT-monitor input/output characteristic LUT.

Figure 5:
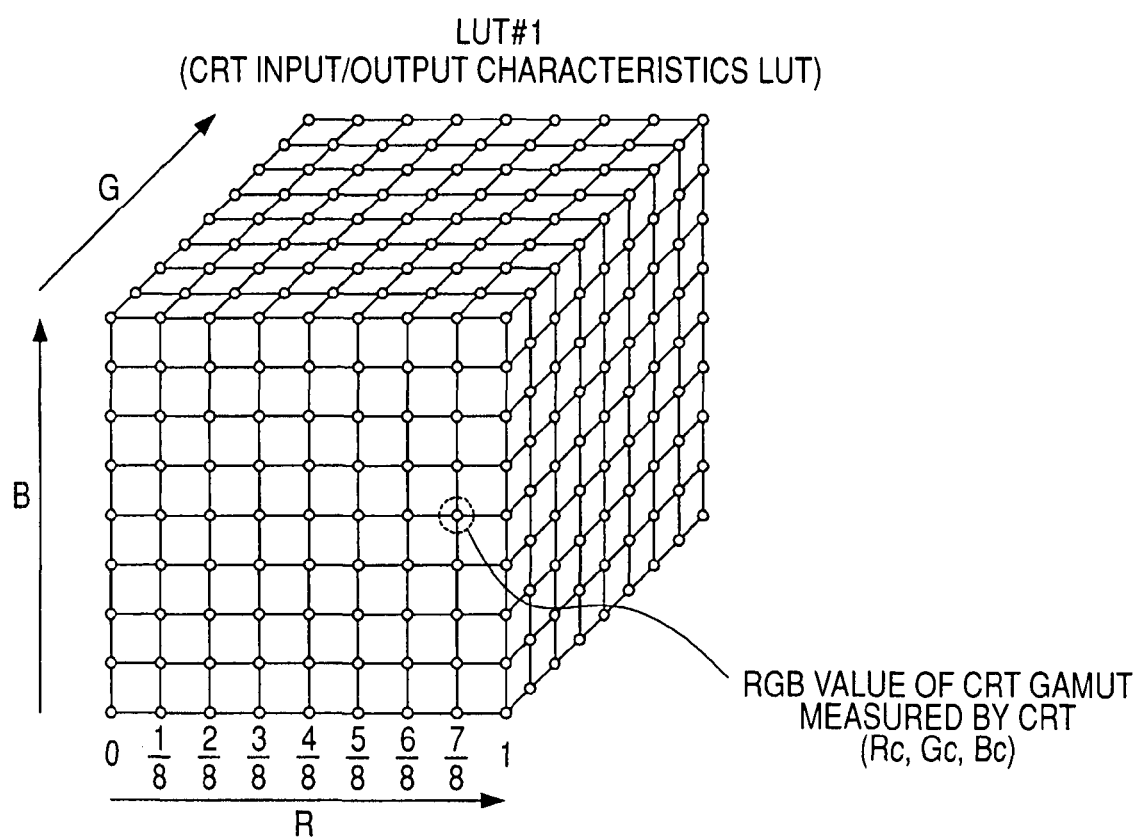
FIG. 5 is a diagram for explaining a process for generating the 3DLUT for emulation according to the embodiment.

As shown in FIG. 5, this LUT#1 divides a range of 0.0 to 1.0 of an R value, a G value, and a B value on R, G, and B axes at predetermined dividing points (e.g., divides the range at equal intervals) and has N×N×N lattice points. (Output values of axes and lattice points of a 3DLUT are not limited to RGB values. Values of other colorimetric systems such as XYZ, YCC, CMY, L*a*b*, and CIE_LUV may be used.)

Output RGB values corresponding to input RGB values are stored in the respective lattice points formed three dimensionally. In this LUT#1, the input RGB values and the output RGB values of the respective lattice points corresponding to the input RGB values are values corresponding to the input and output characteristics (the color distortion) of the CRT monitor.

The LUT#1 at this stage is equivalent to the 3DLUT in FIG. 2A.

In step F102, the arithmetic unit 42 converts values of the respective lattice points of the LUT#1 into a gamut of the LED liquid crystal monitor and overwrites values obtained by the gamut conversion on the values of the respective lattice points.

Figure 6:
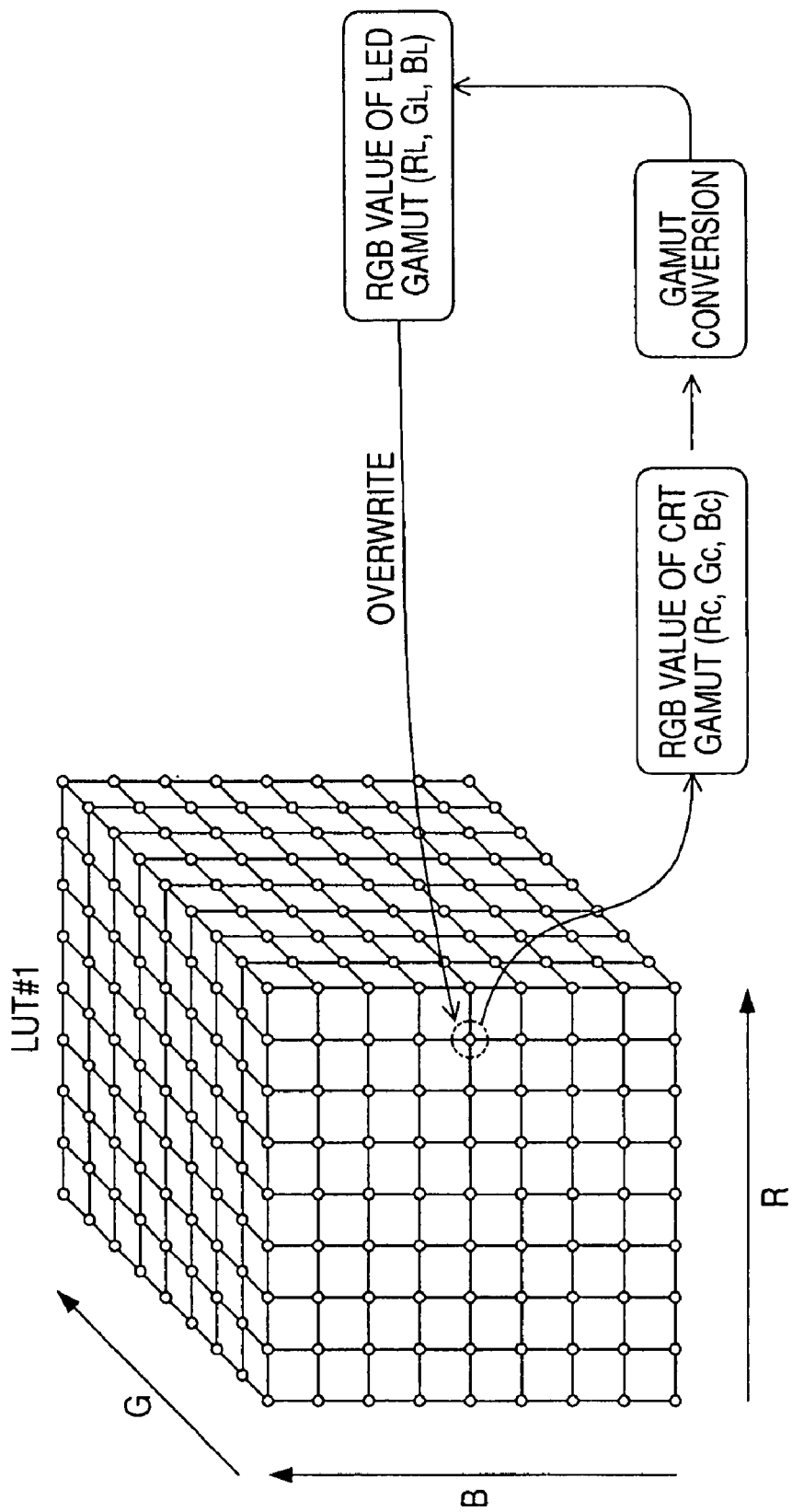
FIG. 6 is a diagram for explaining a process for generating the 3DLUT for emulation according to the embodiment.

A state of this processing is shown in FIG. 6. For example, a value (Rc, Gc, Bc) is stored as an RGB value of a CRT gamut in a certain lattice points of the LUT#1.

The arithmetic unit 42 subjects this value (Rc, Gc, Bc) to the gamut conversion to obtain an RGB value (RL, GL, BL) in a gamut of the LED liquid crystal monitor. The arithmetic unit 42 overwrites the RGB value (RL, GL, BL) on the lattice point (the lattice point in which the value (Rc, Gc, Bc) is stored) of the LUT#1.

The processing for converting the RGB value (Rc, Gc, Bc) in the gamut of the CRT monitor into the RGB value (RL, GL, BL) in the gamut of the LED liquid crystal monitor can be performed by, for example, a 3×3 matrix arithmetic processing.

First, the arithmetic unit 42 converts the RGB value (Rc, Gc, Bc) in the gamut of the CRT monitor into an XYZ value according to the following Formula 6.

$$\begin{bmatrix} X \\ Y \\ Z \end{bmatrix} = [M] \begin{bmatrix} Rc \\ Gc \\ Bc \end{bmatrix}$$

"M" is a 3×3 matrix coefficient for converting an RGB value in the CRT gamut into an XYZ value.

Subsequently, the arithmetic unit 42 converts the XYZ value into a gamut of the LED liquid crystal monitor according to Formula 7.

$$\begin{bmatrix} R_L \\ G_L \\ B_L \end{bmatrix} = [M'] \begin{bmatrix} X \\ Y \\ Z \end{bmatrix}$$

"M'" is a 3×3 matrix coefficient for converting an XYZ value into an RGB value in the gamut of the LED liquid crystal monitor.

In this example, since the narrow gamut of the CRT monitor is converted into the wider gamut of the LED liquid crystal monitor, such matrix conversion may be used. However, for example, when a wide gamut is converted into a narrow gamut, it is effective to use three-dimensional gamut compression processing.

When the gamut conversion is applied to RGB values of the respective lattice points in step F102, values stored in all the lattice points of the LUT#1 are converted into RGB values in the gamut of the LED liquid crystal monitor.

At this point in time, the LUT#1 is a 3DLUT including a conversion element for the gamut conversion and a conversion element for reproducing the input and output characteristics of the CRT monitor. In other words, the LUT#1 is a combination of the target-device characteristic 3DLUT and the gamut conversion 3DLUT shown in FIGS. 2A and 2B.

Subsequently, the arithmetic unit 42 performs processing for introducing a conversion element of the LED correction 3DLUT (the LUT(B)) generated by the processing in FIG. 8, i.e., the LED correction 3DLUT equivalent to the device-in-use correction 3DLUT shown in FIG. 2C, into this LUT#1.

Therefore, in step F103, the arithmetic unit 42 performs processing for finding lattice positions closest to respective lattice points of the LUT#1 from the respective axes of the LED correction 3DLUT (the LUT(B)) and overwriting values of lattice points corresponding to the lattice positions on the lattice points of the LUT#1.

Figure 7:
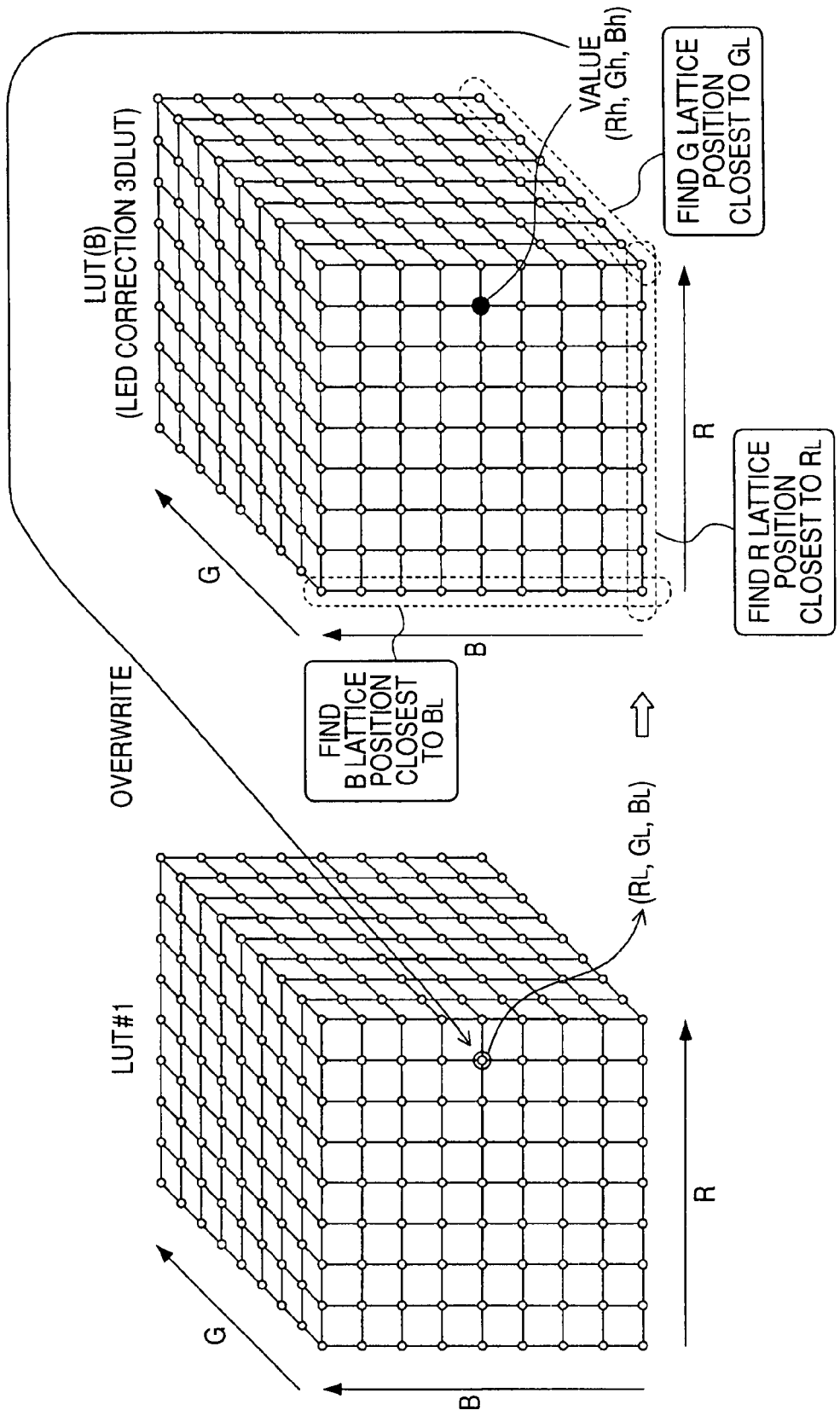
FIG. 7 is a diagram for explaining a process for generating the 3DLUT for emulation according to the embodiment.

A state of this processing is shown in FIG. 7.

As described above, the values in the gamut of the LED liquid crystal monitor are stored in the respective lattice points of the LUT#1. For example, a value stored in a lattice point marked by a double circle in the LUT#1 in FIG. 7 is (RL, GL, BL).

For each of the values RL, GL, and BL stored in the lattice point marked by the double circle, a closest value on each axis of the LUT(B) is searched for. For the value RL, a closest value (a lattice position on the R axis) is searched for as a value on the R axis of the LUT(B). For the value GL, a closest value (a lattice position on the G axis) is searched for as a value on the G axis of the LUT(B). Moreover, for the value BL1, a closest value (a lattice position on the B axis) is searched for as a value on the B axis of the LUT(B).

Here, a lattice position of one lattice point is derived from three lattice positions of the LUT (B) found. It is assumed that this lattice point is a lattice point marked by a black circle in the figure.

An RGB value stored in the lattice point marked by the black circle is (Rh, Gh, Bh). This RGB value (Rh, Gh, Bh) is overwritten on the lattice point marked by the double circle of the LUT#1.

Such processing is executed for all the lattice points of the LUT#1.

The LUT(B) described above is a 3DLUT having characteristics opposite to the input and output characteristics of the LED liquid crystal monitor. Therefore, a conversion element for correcting the input and output characteristics of the LED liquid crystal monitor is added to the LUT#1 by performing this processing.

At a point in time when such processing is applied to the values of all the lattice points of the LUT#1 in step F103, this LUT#1 is completed as the 3DLUT for emulation 2.

This LUT#1 (the 3DLUT for emulation 2) is a 3DLUT including the conversion element for the gamut conversion, the conversion element for reproduction of the input and output characteristics of the CRT monitor, and the conversion element for correction of the input and output characteristics of the LED liquid crystal monitor.

When this 3DLUT for emulation 2 is installed in the color converting device 1 in FIG. 1, not only the gamut conversion for the gamut of the CRT monitor and the gamut of the LED liquid crystal monitor but also the color conversion with the input and output characteristics of the LED liquid crystal monitor as the device in use and the input and output characteristics of the CRT monitor as the target device taken into account is executed. Consequently, emulation with highly accurate reproducibility is realized.

When correction of the input and output characteristics of the device in use and correction corresponding to the input and output characteristics of the target device are performed in the 3DLUT for emulation 2, this means that the correction of the input and output characteristics is also performed three dimensionally according to an R value, a G value, and a B value.

For example, it is also conceivable to use a one-dimensional table for the correction of the input and output characteristics of the display device. However, it is difficult to perform sufficient correction using the one-dimensional table. The correction of the input and output characteristics will be explained with reference to FIGS. 13 to 16.

Figure 13:
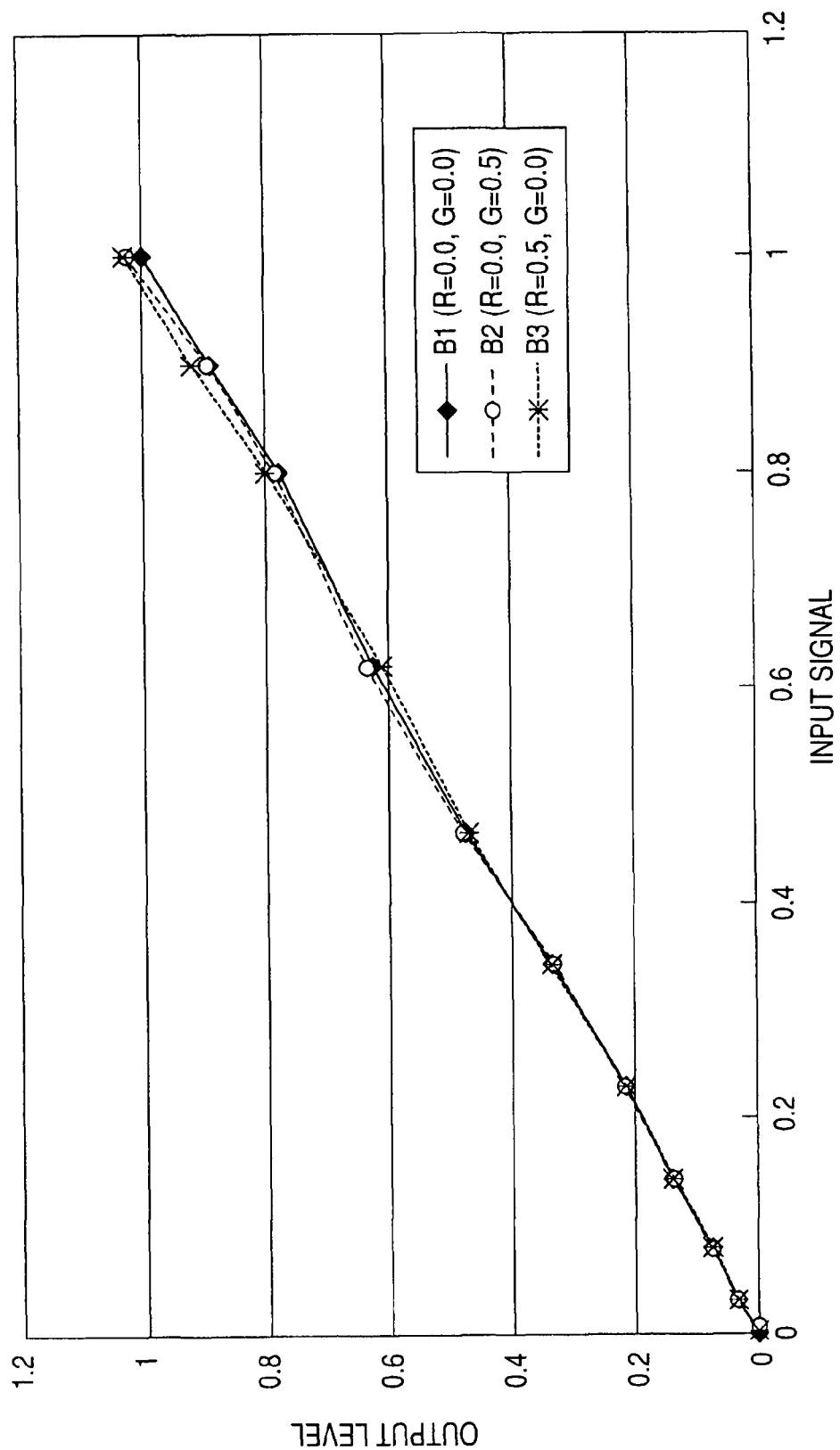
FIG. 13 is a diagram for explaining input and output characteristics of a CRT monitor.

FIG. 13 shows input and output characteristics of the B value (blue) of the CRT monitor.

A characteristic B1 is a characteristic obtained when the R value is fixed to 0.0, the G value is fixed to 0.0, and the B value is changed to 0.0, 0.1, . . . , and 1.0.

A characteristic B2 is a characteristic obtained when the R value is fixed to 0.0, the G value is fixed to 0.5, and the B value is changed to 0.0, 0.1, . . . , and 1.0.

A characteristic B3 is a characteristic obtained when the R value is fixed to 0.5, the G value is fixed to 0.0, and the B value is changed to 0.0, 0.1, . . . , and 1.0.

It is seen from FIG. 13 that, in the CRT monitor, the input and output characteristics of the B value (blue) changes according to a state of mixing of the R value (red) and the G value (green).

Figure 14:
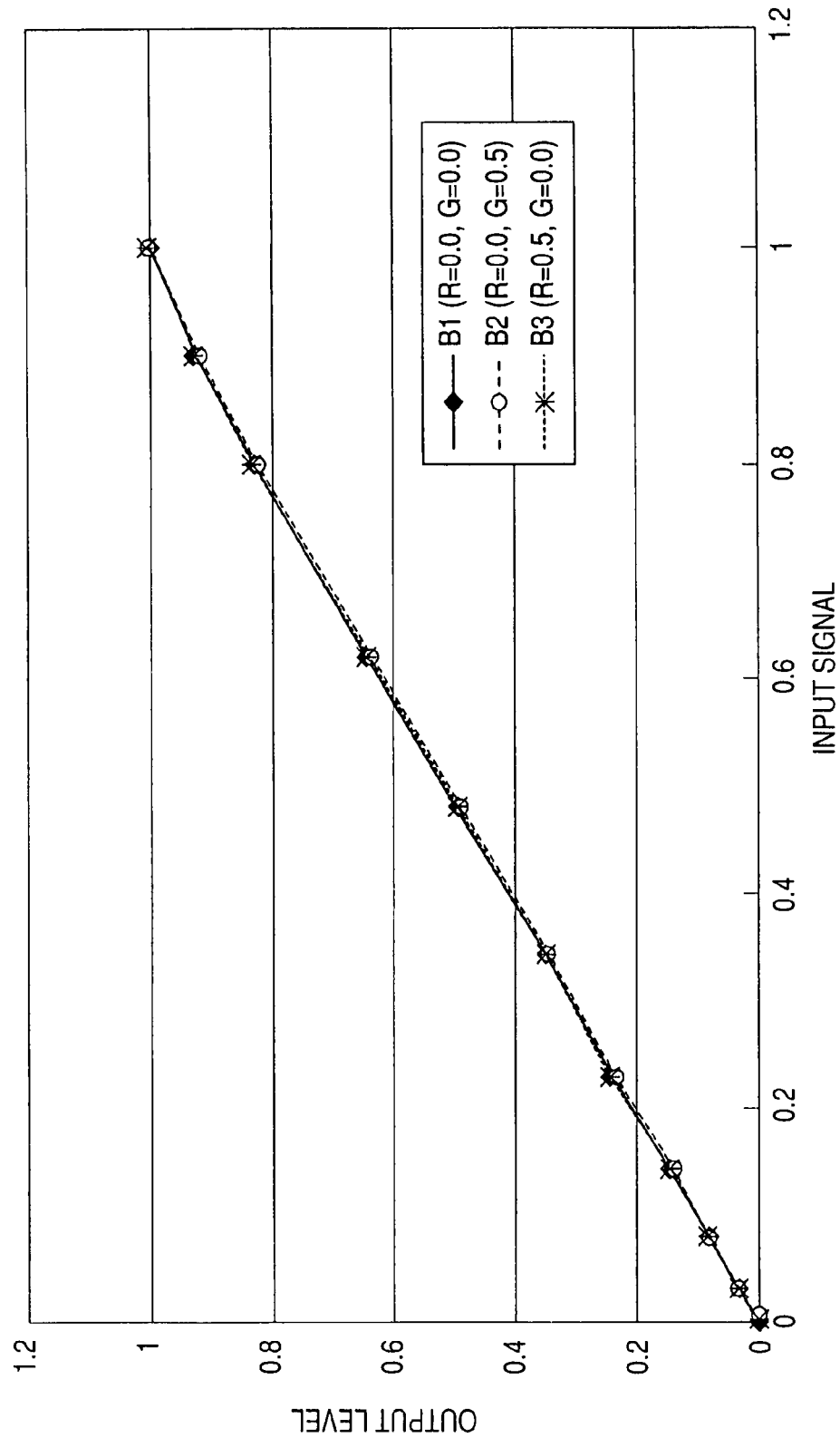
FIG. 14 is a diagram for explaining input and output characteristics of an LED liquid crystal monitor.

FIG. 14 shows input and output characteristics of the B value (blue) of the LED liquid crystal monitor.

A characteristic B1 is a characteristic obtained when the R value is fixed to 0.0, the G value is fixed to 0.0, and the B value is changed to 0.0, 0.1, . . . , and 1.0.

A characteristic B2 is a characteristic obtained when the R value is fixed to 0.0, the G value is fixed to 0.5, and the B value is changed to 0.0, 0.1, . . . , and 1.0.

A characteristic B3 is a characteristic obtained when the R value is fixed to 0.5, the G value is fixed to 0.0, and the B value is changed to 0.0, 0.1, . . . , and 1.0.

It is seen from FIG. 14 that, in the LED liquid crystal monitor, as in the CRT monitor, the input and output characteristics of the B value (blue) changes according to a state of mixing of the R value (red) and the G value (green).

Figure 15:
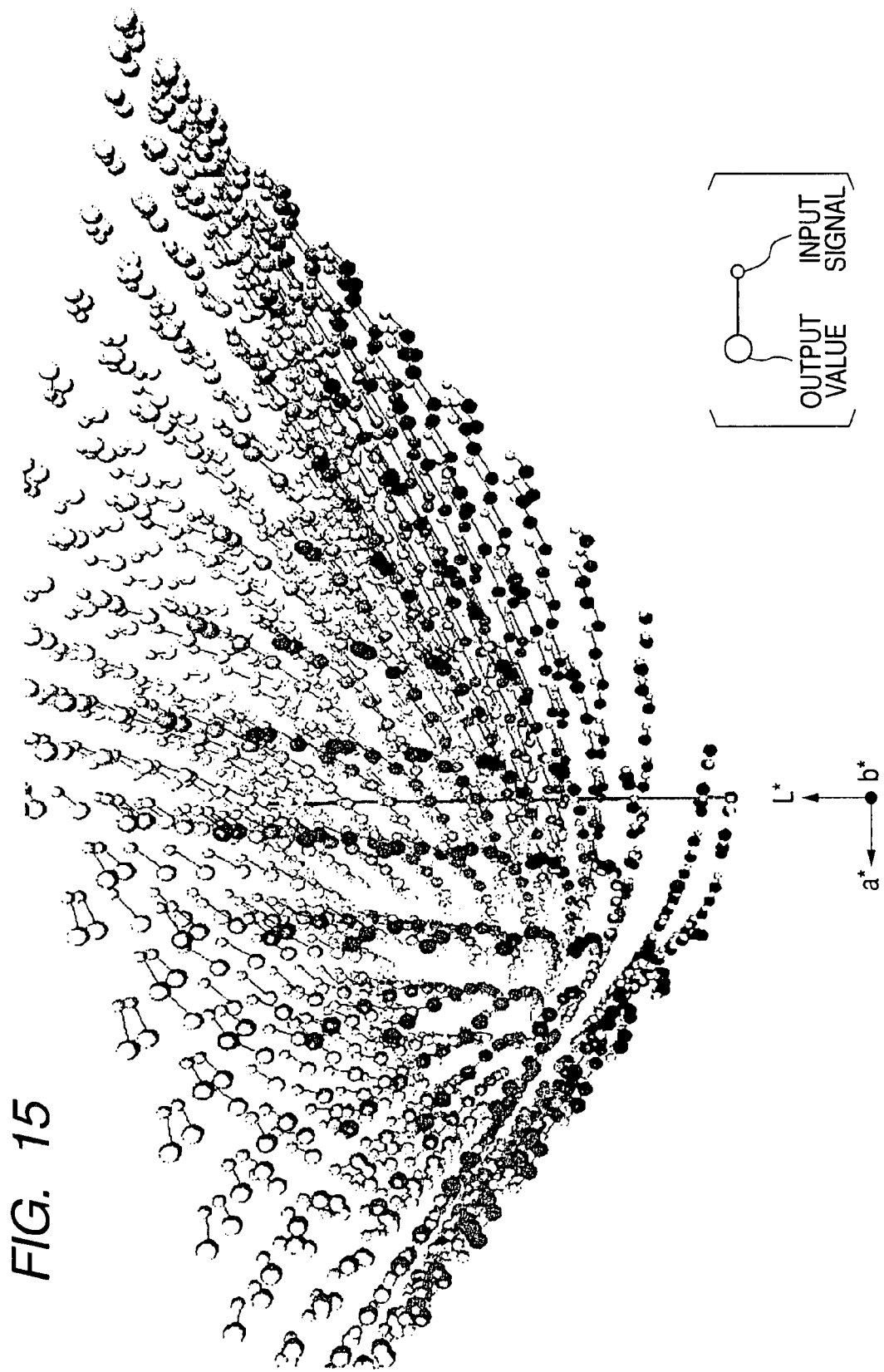
FIG. 15 is a diagram for explaining the input and output characteristics of the LED liquid crystal monitor.
Figure 16:
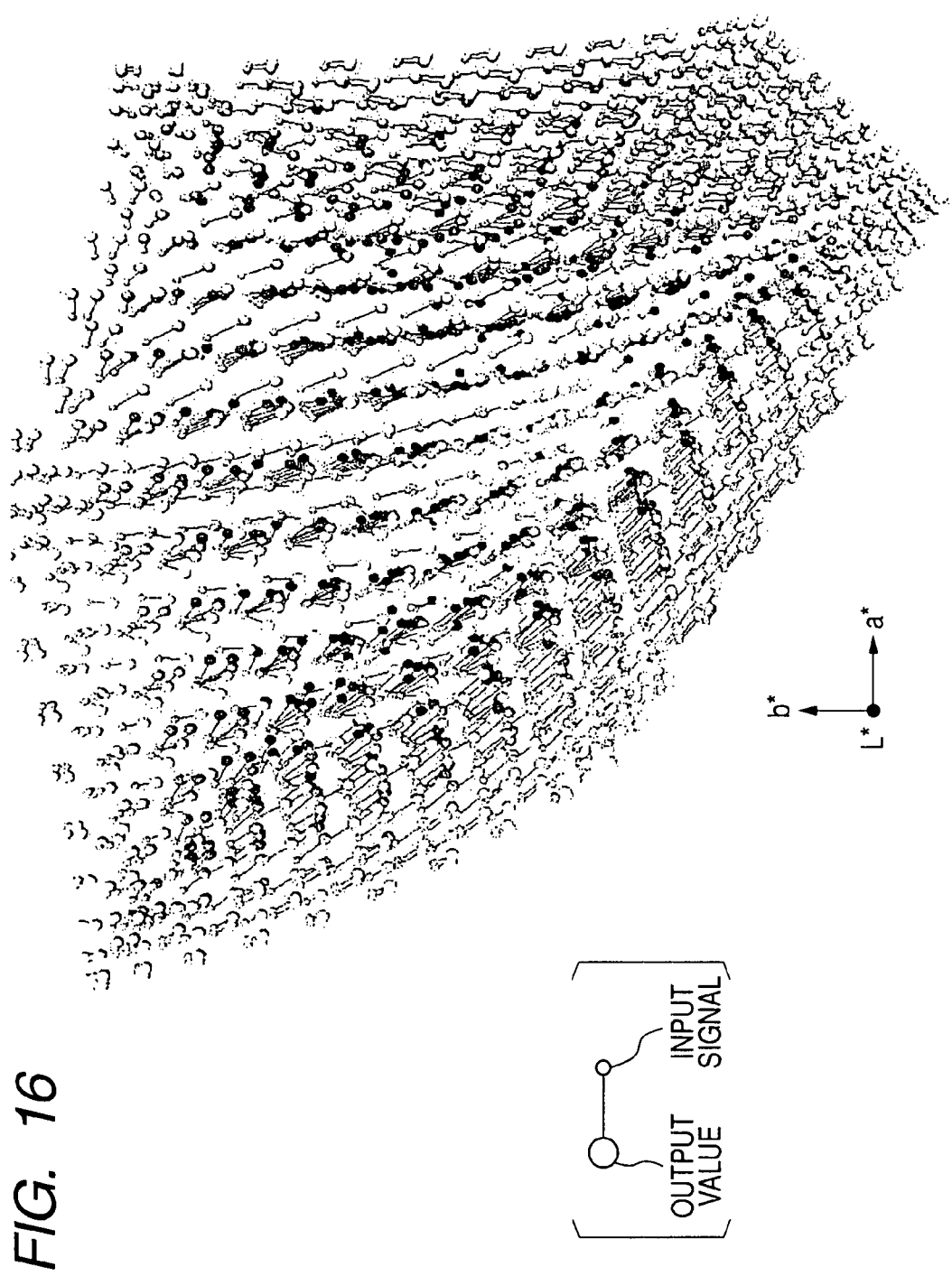
FIG. 16 is a diagram for explaining the input and output characteristics of the LED liquid crystal monitor.

FIGS. 15 and 16 show the input and output characteristics of the LED liquid crystal monitor in three-dimensional display. In each of the figures, input signal values and output values (measured values) are plotted in an L*a*b* three-dimensional space. Small spheres indicate the input signal values and large spheres indicate the output values (the measured values).

FIG. 15 shows the input and output characteristics in a plane direction with an a* value and an L* value set as axes. FIG. 15 shows the input and output characteristics in a plane direction with an a* value and a b* value set as axes. FIG. 16 is a diagram of the three-dimensional space in FIG. 15 viewed from above.

In FIGS. 15 and 16, when an input signal is displayed without distortion, a small sphere indicating an input signal value and a large sphere indicating an output value overlap each other. However, when distortion is larger, a straight line connecting the small and large spheres is longer.

As it is seen from these figures, a majority of signals have distortion and are distorted in various directions.

It is seen from FIGS. 13, 14, 15, and 16 that input and output characteristics (color distortion characteristics) of a display device are characteristics different for each of primary color signals of R, G, and B and, therefore, color distortion of the display device is represented three dimensionally.

Therefore, it is difficult to correct the input and output characteristics using the one-dimensional table. In other words, even if color conversion is performed as correction of the input and output characteristics of the display device using the one-dimensional table (or a one-dimensional correction operation, etc.), the correction is not proper correction.

On the other hand, in this embodiment, conversion corresponding to the input and output characteristics of each of the target device and the device in use is performed using the three-dimensional table as the 3DLUT for emulation 2. In other words, since color conversion for correction corresponding to the input and output characteristics is performed using the three-dimensional table, it is possible to realize proper color conversion and realize more highly accurate emulation display.

For the color converting device 1, since only one 3DLUT for emulation 2 has to be stored, a storage capacity necessary for saving a conversion table does not increase and a processing load of the color conversion processing do not increase either.

When a program for the processing for generating the 3DLUT for emulation 2 explained with reference to FIGS. 4 and 8 is installed in information processing devices such as a personal computer, it is possible to realize the 3DLUT generating device 30 that generates the 3DLUT for emulation 2.

The color converting device 1 is a dedicated device that is built in the device in use or connected to an image processing device such as a display device as described above. Besides, it is also possible to realize the color converting device 1 by installing the 3DLUT for emulation 2 and a program for performing the conversion processing using the 3DLUT for emulation 2 in, for example, a general-purpose computer device.

It is possible to record the program for generating the 3DLUT for emulation 2 and the program for realizing the color converting device 1 in an HD (Hard Disk) as a recording medium built in a personal computer or a device on a video editing system, a ROM in a microcomputer having a CPU, and the like in advance.

Alternatively, it is also possible to store (record) the programs in removable recording media such as a flexible disk, a CD-ROM (Compact Disk Read Only Memory), an MO (Magneto optical) disk, a DVD (Digital Versatile Disk), a semiconductor memory, and a memory card temporarily or permanently. It is possible to provide such removable recording media as so-called package software.

It is possible to install these programs in a personal computer or the like from the removable media. It is also possible to download the programs from a download site through networks such as a LAN (Local Area Network) and the Internet.

[4. Examples of Use of a Color Converting Device]

Examples of use of the color converting device 1 described above are shown in FIGS. 17A to 17C.

Figure 17A:
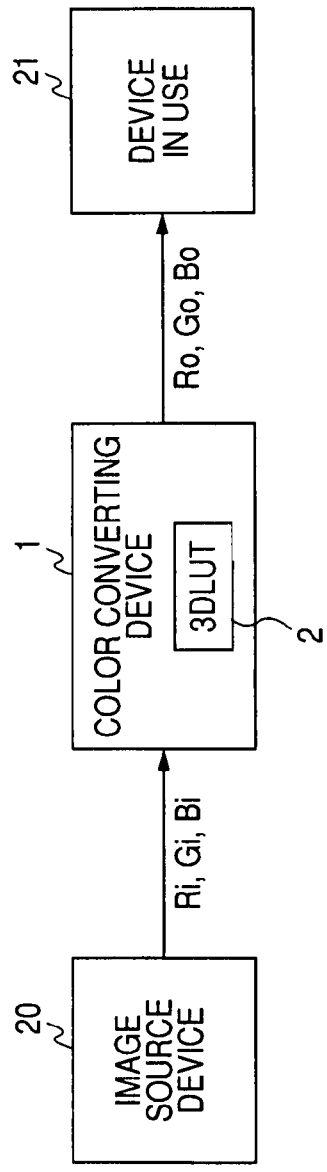
FIGS. 17A to 17C are diagrams for explaining examples of use of a color converting device 1 according to the embodiment.

In FIG. 17A, the color converting device 1 is formed as, for example, a standalone device and connected between an image source device 20 and a device in use 21.

The image source device 20 in this context only has to be a device that outputs an image signal. For example, various devices such as a computer, a video editing device, a video player, imaging devices such as a video camera and a digital still camera, an image signal receiver (a video tuner), a communication device, and a network terminal device are assumed.

The device in use 21 is a device that performs predetermined image processing for the image signal supplied from the image source device 20. Various devices such as a display device that performs image display processing, a printing device that performs image print processing, and a recording device (a video recorder) that performs image recording processing are assumed. As a type of the recording device, for example, a film recorder that converts digital image data into a film is also conceivable.

An RGB signal before conversion, i.e., an Ri value, a Gi value, and a Bi value, is inputted to the color converting device 1 as the image signal supplied from the image source device 20. The color converting device 1 applies, using the 3DLUT for emulation 2, the color conversion including the three conversion elements, i.e., the correction corresponding to the input and output characteristics of the target device, the gamut conversion, and the correction corresponding to the input and output characteristics of the device in use, to the Ri value, the Gi value, and the Bi value, generates an RGB signal after conversion, i.e., an Ro value, a Go value, and a Bo value, and outputs the RGB signal after conversion to the device in use 21.

As a result, in the device in use 21, an image output as color reproduction in a certain target device is realized. For example, when the device in use 21 is a display device, image display for representing color reproduction in the target device is performed. When the device in use 21 is a printing device, image print for representing color reproduction in the target device is performed.

In this case, if the color converting device 1 has a large number of 3DLUTs for emulation 2 for various devices in use 21 and target devices, it is possible to realize an emulation function according to the device in use 21 connected or the target device selected. In other words, it is possible to realize the general-purpose color converting device 1.

Alternatively, a large number of coefficient groups are stored according to combinations of the large number of devices in use 21 and target devices (a coefficient group of the 3DLUT for emulation 2 is generated and stored in advance for each of the combinations by the method of generating the 3DLUT for emulation 2 described above) and coefficient values of the respective lattice points of the 3DLUT for emulation 2 are changed according to a combination of the device in use 21 connected and the target device selected. This also makes it possible to realize the general-purpose color converting device 1.

Figure 17B:
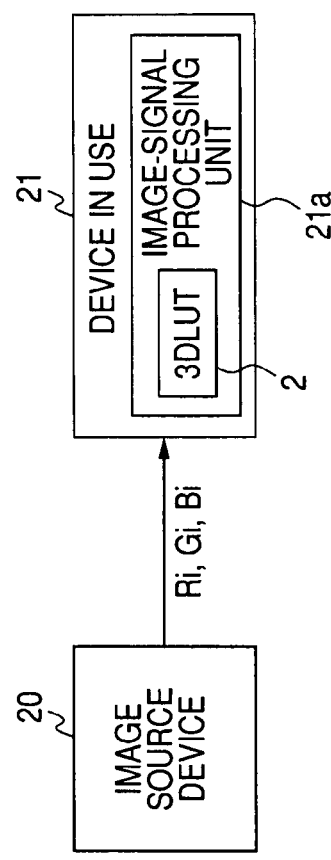

FIG. 17B shows an example in which the device in use 21 has built therein a function of the color converting device 1. As the device in use 21, as in the example described above, a display device, a printing device, a recording device, and the like are assumed.

In this case, an image-signal processing unit 21a in the device in use 21 includes the 3DLUT for emulation 2. The image-signal processing unit 21a performs color conversion processing using the 3DLUT for emulation 2. This makes it possible to realize the functions of the color converting device 1 described above using the image-signal processing unit 21a in the device in use 21.

Consequently, it is possible to apply color conversion including three conversion elements, i.e., the correction corresponding to the input and output characteristics of the target device, the gamut conversion, and correction corresponding to input and output characteristics of the device in use 21 itself, to an Ri value, a Gi value, and a Bi value supplied from the image source device 20, generate an RGB signal after conversion, i.e., an Ro value, a Go value, and a Bo value, and perform display, printing, recording, external output, and the like using this RGB signal after conversion.

In this case, the device in use 21 as an object of color conversion processing is fixed as a device. However, to select various devices as the target device, it is possible to prepare a large number of 3DLUTs for emulation 2 or select a coefficient value of the 3DLUT for emulation 2 for each of the target devices.

Figure 17C:
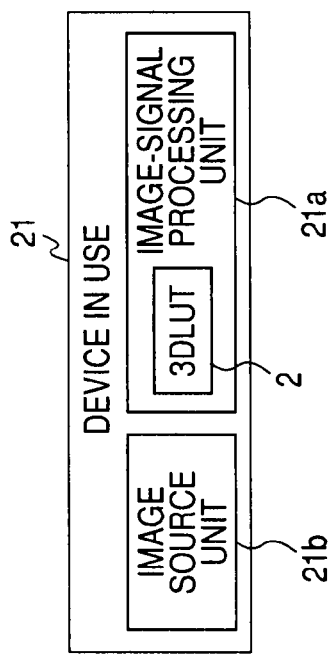

FIG. 17C shows an example in which the device in use 21 has built therein a function of an image source and a function of the color converting device 1.

An image source unit 21b indicates a component for obtaining an image signal such as an imaging unit or a scanner unit. Therefore, as the device in use 21 in this case, an imaging device, a scanner device, and the like are assumed. As a type of the scanner device, for example, a film scanner that converts an image as a film into a digital image signal is conceivable.

In this case, as in the above case, the image-signal processing unit 21a in the device in use 21 includes the 3DLUT for emulation 2. The image-signal processing unit 21a performs color conversion processing using the 3DLUT for emulation 2. This makes it possible to realize the functions of the color converting device 1 described above using the image-signal processing unit 21a in the device in use 21.

In this case, as in the above case, the device in use 21 as an object of the color conversion processing is fixed as a device. However, to select various devices as target devices, it is possible to prepare a large number of 3DLUTs for emulation 2 or select a coefficient value of the 3DLUT for emulation 2 for each of the target devices.

Figure 18:
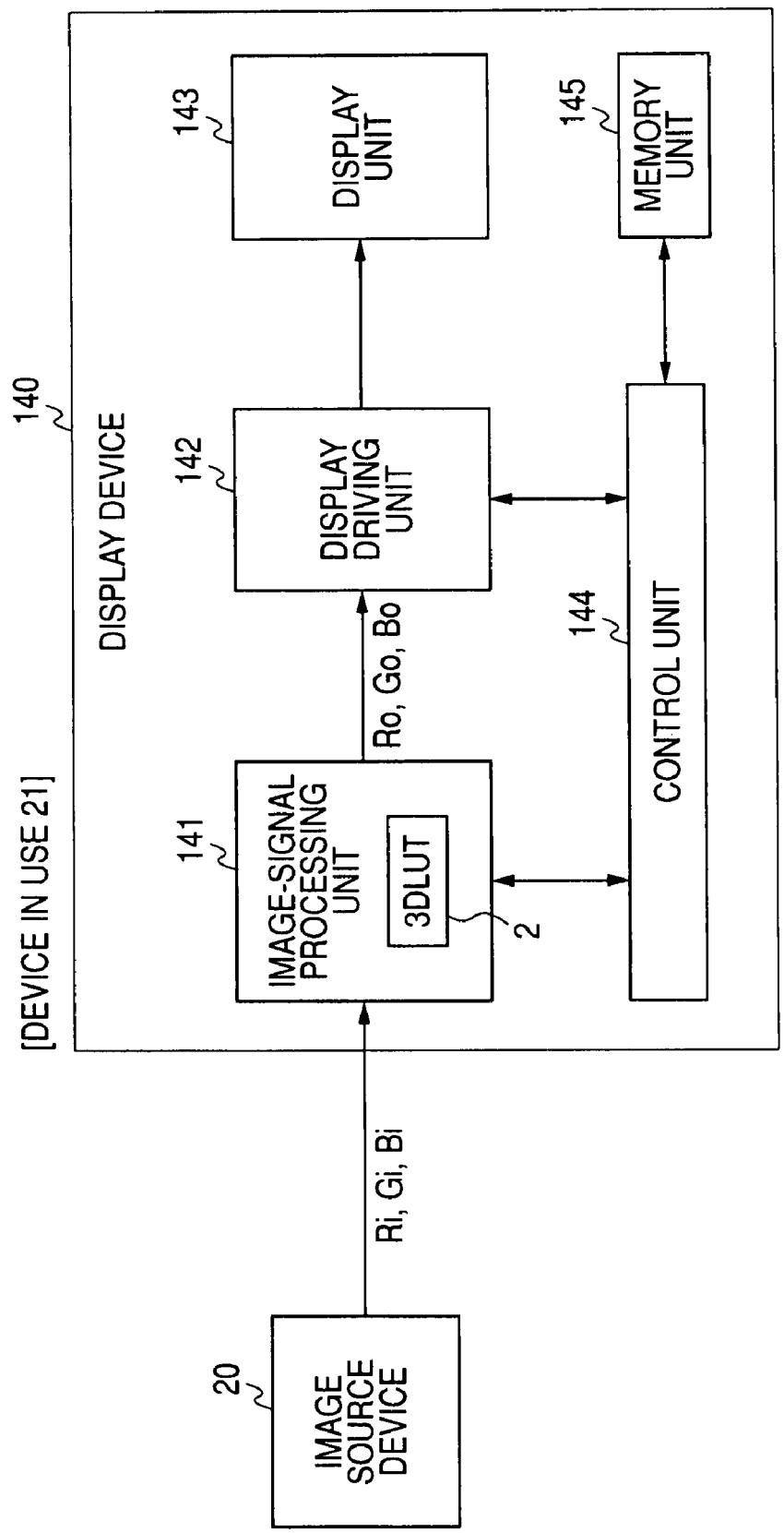
FIG. 18 is a block diagram of a display device including a color converting function according to the embodiment.

[5. Example in Which a Color Converting Device is Built in a Display Device]

as an example in which the functions of the color converting device is built in the device in use 21 as shown in FIG. 17B, an example in which the functions of the color converting device 1 is built in a display device 140 is shown in FIG. 18.

As the display device 140, various display devices such as a CRT monitor device, a liquid crystal monitor device, a projector device, and an organic EL (Electroluminescence) monitor device are conceivable.

The display device 140 includes an image-signal processing unit 141, a display driving unit 142, a display unit 143, a control unit 144, and a memory unit 145.

The image-signal processing unit 141 applies various kinds of processing for display to an image signal supplied from the image source device 20 and supplies to the image signal to the display driving unit 142. The display driving unit 142 drives respective pixels of the display unit 143 according to the image signal and causes the display unit 143 to execute image display.

The control unit 144 is formed by, for example, a microcomputer and controls operations of the respective units. The memory unit 145 includes a ROM area, a RAM area, and a nonvolatile memory area. The memory unit 145 stores an operation program, coefficients for operation control, control parameters, and programs of the control unit 144 and is used as a work area of the control unit 144.

The image-signal processing unit 141 includes the 3DLUT for emulation 2. When the image-signal processing unit 141 performs color conversion processing using the 3DLUT for emulation 2, it is possible to realize the functions of the color converting device 1 described above using the image-signal processing unit 141 in the display device 140.

Consequently, it is possible to apply color conversion including three conversion elements, i.e., the correction corresponding to the input and output characteristics of the target device, the gamut conversion, and correction corresponding to input and output characteristics of the display device 140 as the device in use 21, to an Ri value, a Gi value, and a Bi value supplied from the image source device 20, generate an RGB signal after conversion, i.e., an Ro value, a Go value, and a Bo value, and perform display on the display unit 143 using the RGB signal after conversion.

In other words, it is possible to realize color reproduction in a certain target device according to display on the display unit 143. For example, when the target device is another kind of display device, it is possible to perform color reproduction display on the display device. When the target device is a certain imaging device, it is possible to perform color reproduction display as an image photographed by the imaging device. When the target device is a printing device, it is possible to perform color reproduction display as an image printed by the printing device.

In this case, the device in use 21 as an object of the color conversion processing is fixed as the display device 140. The target device may be fixed as a specific device. However, it is also possible to select various devices as target devices. For example, when the display device 140 (the device in use 21) is an LED liquid crystal monitor device, it is possible to select other kinds of display devices such as a CRT monitor device and a projector device as target devices or select various printing devices and various imaging devices as target devices.

When it is possible to select a target device, a coefficient group of the 3DLUT for emulation 2 is generated in advance according to the method of generating the 3DLUT for emulation described above and is stored in the memory unit 145 for each of combinations of various target devices and the display device 140 as the device in use 21. According to the selection of a target device, the control unit 144 reads out a coefficient group corresponding to the target device from the memory unit 145 and rewrites coefficients of the respective lattice points of the 3DLUT for emulation 2 in the image-signal processing unit 141.

According to such a method, it is possible to select one of plural target devices and execute emulation display of the target device. In other words, it is possible to selectively realize color reproduction in the various target devices according to the display on the display unit 143.

[6. Example in Which a Color Converting Device is Built in a Printing Device]

Figure 19:
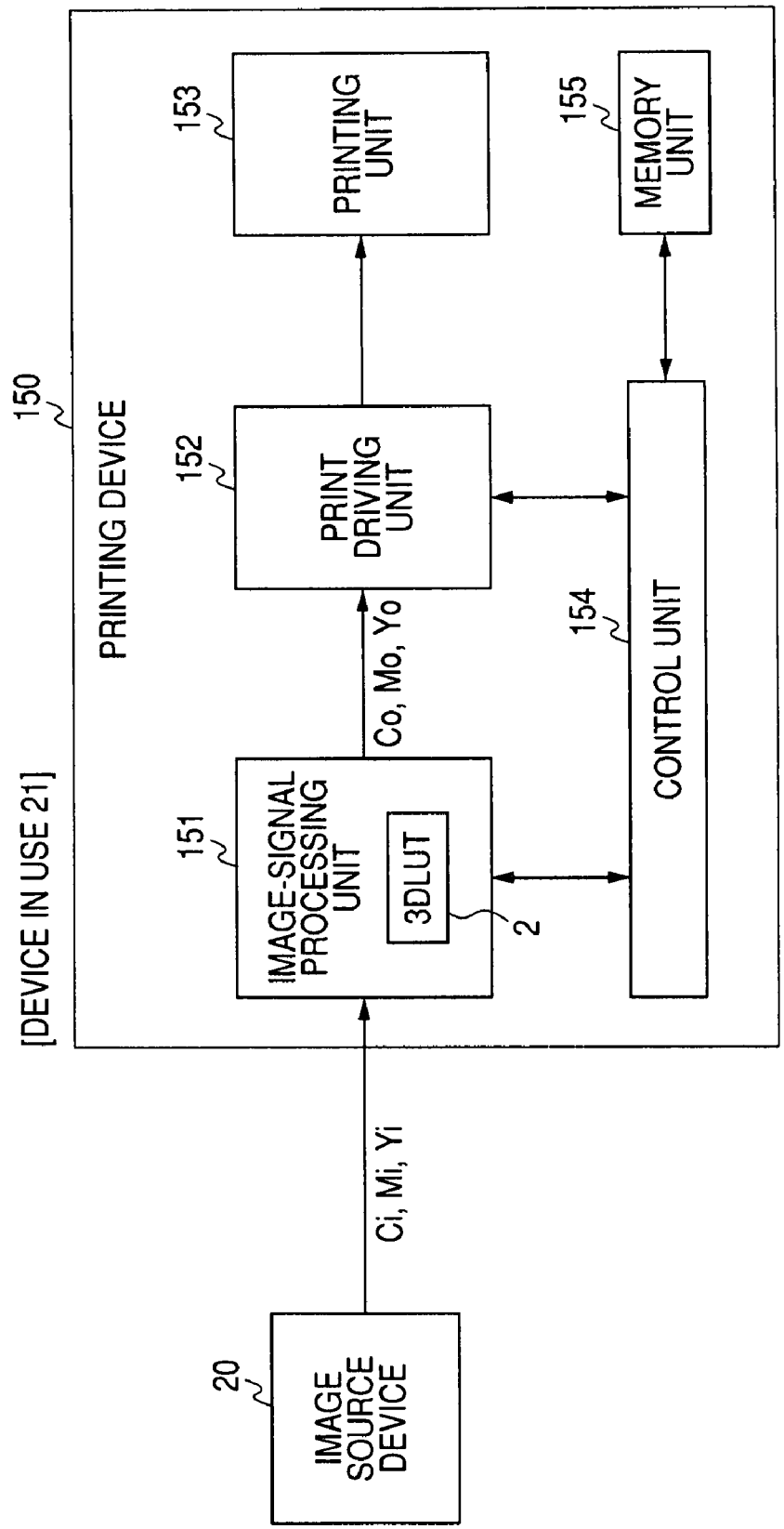
FIG. 19 is a block diagram of a printing device including the color converting function according to the embodiment.

As an example in which the functions of the color converting device 1 is built in the device in use 21 as shown in FIG. 17B, an example in which the functions of the color converting device 1 is built in a printing device 150 is shown in FIG. 19. As the printing device 150, various color printers such as a laser printer device, an ink-jet printer device, and a thermal printer device are conceivable.

The printing device 150 includes an image-signal processing unit 151, a print driving unit 152, a printing unit 153, a control unit 154, and a memory unit 155.

The image-signal processing unit 151 applies various kinds of processing for printing to an image signal supplied from the image source device 20 and supplies the image signal after processing to the print driving unit 152. The print driving unit 152 drives a print head mechanism of the printing unit 153 according to the image signal and causes the printing unit 153 to execute printing.

The control unit 154 is formed by, for example, a microcomputer and controls operations of the respective units. The memory unit 155 includes a ROM area, a RAM area, and a nonvolatile memory area. The memory unit 155 stores an operation program, coefficients for operation control, control parameters, and programs of the control unit 154 and is used as a work area of the control unit 154.

The image-signal processing unit 151 includes the 3DLUT for emulation 2. When the image-signal processing unit 151 performs color conversion processing using the 3DLUT for emulation 2, it is possible to realize the functions of the color converting device 1 described above using the image-signal processing unit 151 in the printing device 150.

Since a CMY signal is often used in the printing device, in the example shown in FIG. 19, a Ci value, an Mi value, and a Yi value are supplied from the image source device 20 to the printing device 150 as an input signal of the CMY colorimetric system.

The image-signal processing unit 151 applies, using the 3DLUT for emulation 2, color conversion including three conversion elements, i.e., the correction corresponding to the input and output characteristics of the target device, the gamut conversion, and correction corresponding to input and output characteristics of the printing device 150 as the device in use 21, to the Ci value, the Mi value, and the Yi value supplied from the image source device 20 to generate a CYM signal after conversion, i.e., a Co value, an Mo value, and a Yo value. Consequently, it is possible to perform printing in the printing unit 153 using this CMY signal after conversion.

In other words, it is possible to realize color reproduction in a certain target device according to printing in the printing unit 153. For example, when the target device is another kind of printing device, it is possible to perform color reproduction printing in the printing device. When the target device is a certain imaging device, it is possible to perform color reproduction printing for an image photographed by the imaging device. Further, when the target device is a certain display device, it is possible to perform color reproduction printing for an image displayed on the display device.

In this case, the device in use 21 as an object of the color conversion processing is fixed as the printing device 150. The target device may be fixed as a specific device. However, it is also possible to select various devices as target devices. For example, when the printing device 150 (the device in use 21) is a laser printer, it is possible to select other kinds of printing devices such as a thermal printer and an ink-jet printer as target devices or select various display devices and various imaging devices as target devices. Therefore, a coefficient group of the 3DLUT for emulation 2 is generated in advance according to the method of generating the 3DLUT for emulation described above and is stored in the memory unit 155 for each of combinations of various target devices and the printing device 150 as the device in use 21. According to the selection of a target device, the control unit 154 reads out a coefficient group corresponding to the target device from the memory unit 155 and rewrites coefficients of the respective lattice points of the 3DLUT for emulation 2 in the image-signal processing unit 151.

According to such a method, it is possible to select one of plural target devices and execute emulation printing for the target device.

Output values of axes and lattice points of a 3DLUT for emulation are not limited to the CMY value. Values of other colorimetric systems such as XYZ, YCC, CMY, L*a*b*, and CIE_LUV may be used.

[7. Example in Which a Color Converting Device is Built in an Imaging Device]

Figure 20:
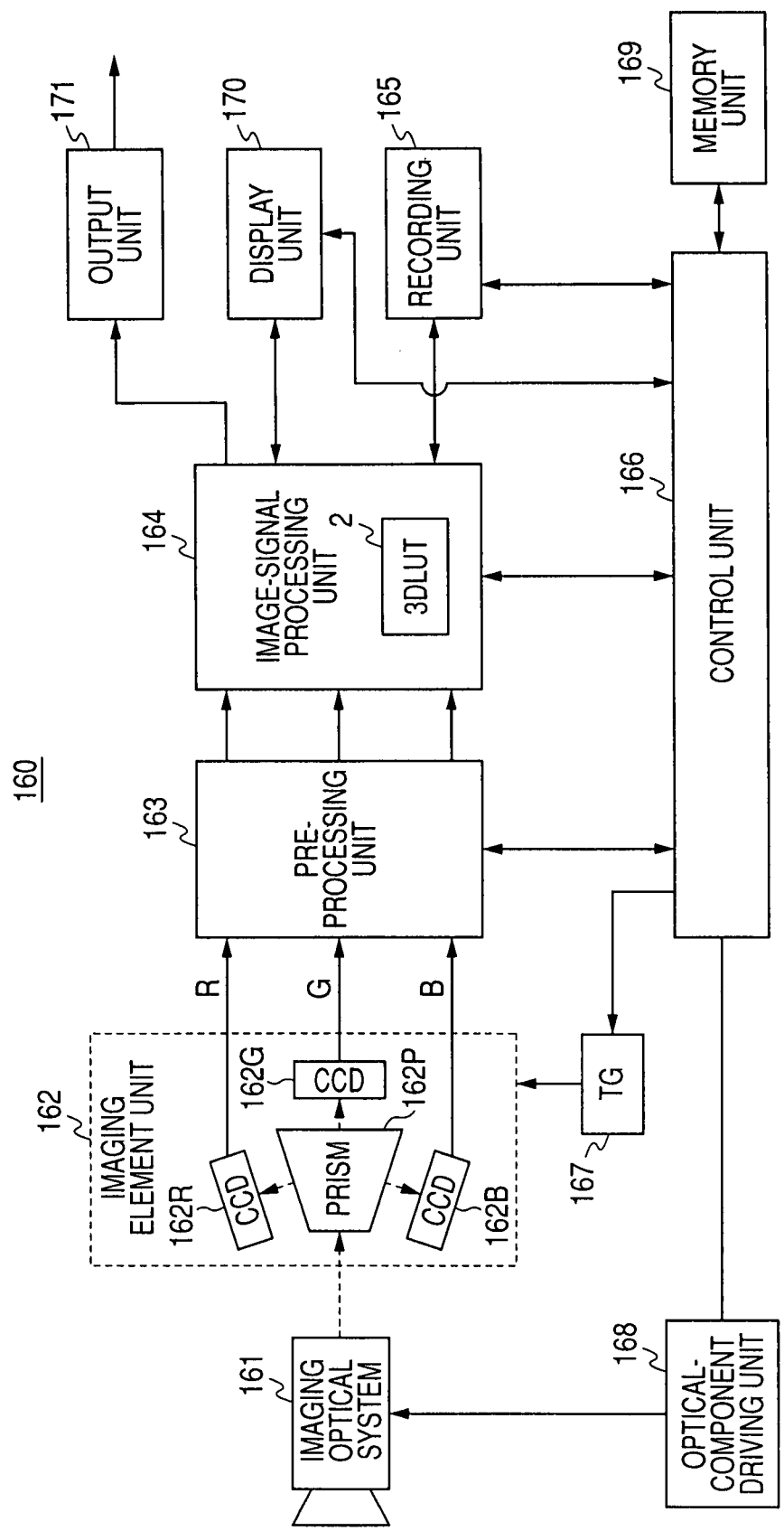
FIG. 20 is a block diagram of an imaging device including the color converting function according to the embodiment.
Figure 21:
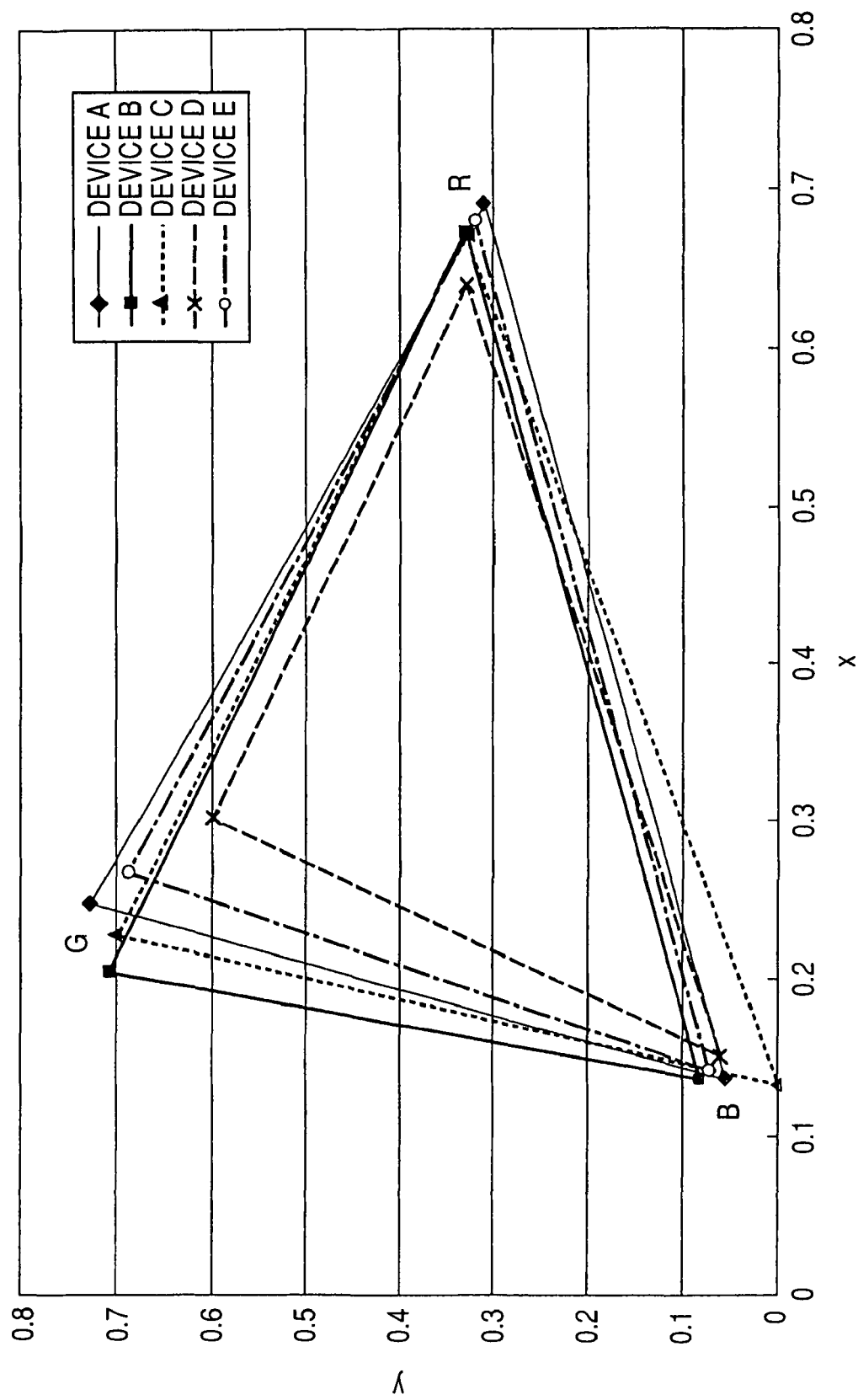
FIG. 21 is a diagram for explaining gamuts of various display devices.

As an example in which the functions of the image source unit 21*b* and the color converting device 1 are built in the device in use 21 as shown in FIG. 17C, an example of as structure in which the functions of the color converting device 1 is built in an imaging device 160 is shown in FIG. 20. The imaging device 160 is a video camera or a digital still camera.

The imaging device 160 includes an imaging optical system 161, an imaging element unit 162, a pre-processing unit 163, an image-signal processing unit 164, a recording unit 165, a control unit 166, a timing generator 167, an optical-component driving unit 168, a memory unit 169, a display unit 170, and an output unit 171.

The imaging optical system 161 includes optical components such as lens systems of a focus lens, a zoom lens, and the like, an optical filter that removes an unnecessary wavelength, and a stop. Light made incident on the imaging optical system 161 from a subject is guided to the imaging element unit 162 via the respective optical components in the imaging optical system 161.

The imaging element unit 162 is constituted as a solid state imaging element unit such as a CCD sensor array or a CMOS sensor array. In the example in FIG. 20, the imaging element unit 162 includes CCD sensors 162R, 162G, and 162B corresponding to the respective colors R, G, and B and a prism 162P that guides lights of the respective colors to the respective CCD sensors 162R, 162G, and 162B.

The imaging element unit 162 photoelectrically converts light guided via the imaging optical system 161 in the CCD sensors 162R, 162G, and 162B and outputs a photographed image signal (an R signal, a G signal, and a B signal).

The pre-processing unit 163 is a so-called analog front-end. The pre-processing unit 163 applies CDS (correlated double sampling) processing, gain processing by a programmable gain amplifier, and A/D conversion processing to the photographed image signal outputted from the imaging element unit 162. The pre-processing unit 163 supplies the photographed image signal subjected to these kinds of processing to the image-signal processing unit 164.

The image-signal processing unit 164 applies luminance processing, color processing, gamma correction processing, white balance processing, and the like to the photographed image signal inputted.

The recording unit 165 applies compression encode and recording format processing corresponding to a recording media to the image signal from the image-signal processing unit 164 and records the image signal in a recording medium. As the recording medium, for example, an HD (Hard Disk), a memory card, a magnetic tape, and an optical disk are assumed.

The display unit 170 displays the image signal from the image-signal processing unit 164. The display unit 170 executes, for example, preview display in an imaging standby state and a monitor display during imaging. The display unit 170 can also display an image reproduced by the recording unit 164.

The photographed image signal outputted from the image-signal processing unit 164 can be outputted to an external device from the output unit 171.

The control unit 166 is formed by, for example, a microcomputer and controls operations of the respective units. The memory unit 169 includes a ROM area, a RAM area, and a nonvolatile memory area. The memory unit 169 stores an operation program, coefficients for operation control, control parameter, and programs of the control unit 164 and is used as a work area of the control unit 164.

The timing generator 167 generates an operation pulse necessary for the imaging element unit 62. The timing generator 167 generates various pulses such as a four-phase pulse for vertical transfer, a field shift pulse, a two-phase pulse for horizontal transfer, and a shutter pulse and supplies the pulses to the imaging element unit 162.

The optical-component driving unit 168 performs driving of the optical components in the imaging optical system 1. The optical-component driving unit 168 performs, for example, driving of a focus lens and a zoom lens and driving of a stop mechanism.

In the imaging device 160, the 3DLUT for emulation 2 is provided in the image-signal processing unit 164. When the image-signal processing unit 164 performs color conversion processing using the 3DLUT for emulation 2, it is possible to realize the functions of the color converting device 1 described above in the imaging device 160.

Consequently, it is possible to apply color conversion including three conversion elements, i.e., the correction corresponding to the input and output characteristics of the target device, the gamut conversion, and correction corresponding to input and output characteristics of the imaging device 160 as the device in use 21, to an Ri value, a Gi value, and a Bi value supplied from the image source unit 21*b* (in this case, the imaging optical system 161, the imaging element unit 162, and the pre-processing unit 163), generate an RGB signal after conversion, i.e., an Ro value, a Go value, and a Bo value, and record, display, and output this RGB signal after conversion.

In this case, the input and output characteristics of the imaging device 160 as the device in unit 21 only has to be regarded mainly as characteristics of an optical element and an imaging element as the imaging optical system 161 and the imaging element unit 162.

When color conversion is performed in the image-signal processing unit 164 using the 3DLUT for emulation 2, it is possible to obtain a photographed image signal as color reproduction in a certain target device.

For example, when the target device is another kind of imaging device, it is possible to obtain a photographed image signal having color reproducibility photographed by the imaging device. In particular, a camera device has different color reproducibility according to a difference of a manufacturer or a model. In most cases, the color reproducibility is different according to a difference of an optical element or an imaging element. Therefore, when another camera device is set as a target device, it is possible to obtain a photographed image signal having color reproducibility of the anther camera.

The device in use 21 as an object of the color conversion processing is fixed as the printing device 160. However, it is also possible to select various devices as target devices. For example, a coefficient group of the 3DLUT for emulation 2 is generated in advance according to the method of generating the 3DLUT for emulation described above and is stored in the memory unit 169 for each of combinations of various target devices and the imaging device 160 as the device in use 21. According to the selection of a target device, the control unit 166 reads out a coefficient group corresponding to the target device from the memory unit 169 and rewrites coefficients of the respective lattice points of the 3DLUT for emulation 2 in the image-signal processing unit 164.

Assuming that the imaging device 160 is an imaging device for video content production such as a video camera for business use, if the functions of the color converting device 1 are implemented in the imaging device 160, advantages described below are obtained.

For example, in a high-performance video camera mounted with the imaging optical system 161 and imaging element unit 162, if it is possible to set a video camera of the past as a target device in an emulation mode, it is possible to obtain a photographed image signal of color reproduction same as that photographed by the video camera of the past. Therefore, in post production such as editing performed by using the photographed image signal, it is possible to use a work flow corresponding to a gamut of the video camera of the past. The work flow is also suitable for matching with a video material photographed by the video camera of the past through editing.

It is possible to smoothly perform conversion to a work flow in which a new gamut is used.

For example, if a gamut same as that of a device that finally displays a video is emulated, it is possible to obtain a photographed image signal that can reproduce faithful colors when the video is finally displayed on the device. This makes it possible to realize a work flow for creating a complete package using a video camera.

It should be understood by those skilled in the art that various modifications, combinations, sub-combinations, and alterations may occur depending on design requirements and other factors insofar as they are within the scope of the appended claims or the equivalents thereof.

What is claimed is:

1. An image processing device that performs color conversion processing using a lookup table (LUT), comprising:
   acquiring means for acquiring an emulation LUT for applying emulation of a gamut to a target device from a device in use, the emulation LUT being generated using (i) a device-in-use LUT for performing correction corresponding to input and output characteristics of the device in use and (ii) a target device LUT for performing correction corresponding to input and output characteristics of the target device;
   generating means including first LUT arithmetic means for updating, for each lattice point forming the target device LUT, a value of the lattice point to a value obtained by gamut-converting the value of the lattice into a gamut of the device-in-use, and second LUT arithmetic means for updating a value of a lattice point forming the target device LUT updated by the first LUT arithmetic means to a value of a lattice point forming the device-in-use LUT,
   wherein the second LUT arithmetic means finds, from the device-in-use LUT, a lattice point closest to the value of the lattice point forming the target device LUT updated by the first. LUT arithmetic means and updates a value of the lattice point found to the value of the lattice point forming the target device LUT updated by the first LUT arithmetic means; and
   converting means for performing gamut conversion in performing the emulation using the emulation LUT acquired by the LUT acquiring means.

2. An image processing device according to claim 1, wherein the generating means generates the emulation LUT using the device-in-use LUT and the target device LUT.

3. An image processing device according to claim 1, further comprising storing means for storing the emulation LUT, wherein
   the acquiring means acquires the emulation LUT from the storing means.

4. An image processing device according to claim 1, wherein the emulation LUT, the device-in-use LUT and the target device LUT are three-dimensional LUTs.

5. An image processing device according to claim 1, wherein the device in use and the target device are display devices that apply color conversion processing and display processing to an image signal.

6. An image processing device according to claim 1, wherein the device in use and the target device are printing devices that apply color conversion processing and print processing to an image signal.

7. An image processing device according to claim 1, wherein the device in use and the target device are imaging devices that apply recording processing or output processing to an image signal obtained by imaging processing.

8. An image processing method, stored on a tangible computer-readable medium that is executed by a hardware processor, of performing color conversion processing using a lookup table (LUT), comprising the steps of:
   acquiring an emulation LUT for applying emulation of a gamut to a target device from a device in use, the emulation LUT being generated using (i) a device-in-use LUT for performing correction corresponding to input and output characteristics of the device in use and (ii) a target device LUT for performing correction corresponding to input and output characteristics of the target device, utilizing a LUT generating device;

updating, for each lattice point forming the target device LUT, a value of the lattice point to a value obtained by gamut-converting the value of the lattice point into a gamut of the device-in-use, utilizing a first LUT arithmetic unit;

updating a value of a lattice point forming the target device LUT updated by the first LUT arithmetic unit to a value of a lattice point forming the device-in-use LUT, utilizing a second LUT arithmetic unit;

finding, from the device-in-use LUT, a lattice point closest to the value of the lattice point forming the target device LUT updated by the first LUT arithmetic unit and updates a value of the lattice point found to the value of the lattice point forming the target device LUT updated by the first LUT arithmetic unit, utilizing the second LUT arithmetic unit; and performing gamut conversion in performing the emulation using the emulation LUT acquired in the LUT acquiring step, utilizing a gamut converting unit.

9. An image processing device, including a hardware processor, that performs color conversion processing using a lookup table (LUT), comprising:

a LUT generating device acquiring an emulation LUT for applying emulation of a gamut to a target device from a device in use, the emulation LUT being generated using (i) a device-in-use LUT for performing correction corresponding to input and output characteristics of the device in use and (ii) a target device LUT for performing correction corresponding to input and output characteristics of the target device;

wherein the LUT generating device including first LUT arithmetic unit for updating, for each lattice point forming the target device LUT, a value of the lattice point to a value obtained by gamut-converting the value of the lattice point into a gamut of the device-in-use, and second LUT arithmetic etic unit for updating a value of a lattice point forming the target device LUT updated by the first. LUT arithmetic unit to a value of a lattice point forming the device-in-use LUT, wherein the second LUT arithmetic unit finds, from the device-in-use LUT, a lattice point closest to the value of the lattice point forming the target device LUT updated by the first LUT arithmetic unit and updates a value of the lattice point found to the value of the lattice point forming the target device LUT updated by the first LUT arithmetic unit; and a gamut converting unit performing gamut conversion in performing the emulation using the emulation LUT acquired by the LUT acquiring unit.

* * * * *